US010532936B2

(12) United States Patent
Al-Azazmeh et al.

(10) Patent No.: US 10,532,936 B2
(45) Date of Patent: Jan. 14, 2020

(54) INTEGRATED SYSTEM WITH AN ABSORPTION REFRIGERATION SUBSYSTEM AND A DESALINATION SUBSYSTEM

(71) Applicant: King Fahd University of Petroleum and Minerals, Dhahran (SA)

(72) Inventors: Ayman Jamal Al-Azazmeh, Dhahran (SA); Mohammad Abdelkarim Antar, Dhahran (SA); Esmail Mohamed Ali Mokheimer, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 62 days.

(21) Appl. No.: 15/826,128

(22) Filed: Nov. 29, 2017

(65) Prior Publication Data

US 2019/0161366 A1 May 30, 2019

(51) Int. Cl.
*C02F 1/14* (2006.01)
*B01D 3/42* (2006.01)
(Continued)

(52) U.S. Cl.
CPC .............. *C02F 1/14* (2013.01); *B01D 1/0082* (2013.01); *B01D 1/28* (2013.01); *B01D 1/2896* (2013.01); *B01D 3/007* (2013.01); *B01D 3/145* (2013.01); *B01D 3/42* (2013.01); *B01D 5/006* (2013.01); *C02F 1/441* (2013.01); *F01K 27/00* (2013.01);
(Continued)

(58) Field of Classification Search
CPC ........ B01D 1/0035; B01D 1/26; B01D 3/065; C02F 1/14; C02F 1/441; C02F 2103/08; F25B 27/007
See application file for complete search history.

(56) References Cited

U.S. PATENT DOCUMENTS 4,083,781 A * 4/1978 Conger ................ B01D 61/022
210/651
4,333,017 A * 6/1982 O'Connell ................ C02F 1/16
290/2
(Continued)

FOREIGN PATENT DOCUMENTS

| CN | 205170431 U | | 4/2016 | |
|---|---|---|---|---|
| FR | 2869307 | * | 10/2005 | ............... B01D 1/26 |
| KR | 1020140064283 B1 | * | 2/2016 | ................ C02F 1/04 |

OTHER PUBLICATIONS

KR1020140064283B1_ENG (KIPRIS machine translation of Kwak) (Year: 2016).*
(Continued)

*Primary Examiner* — Youngsul Jeong
*Assistant Examiner* — Gabriel E Gitman
(74) *Attorney, Agent, or Firm* — Oblon, McClelland, Maier & Neustadt, L.L.P.

(57) ABSTRACT

An integrated system that comprises a solar power subsystem, an absorption refrigeration subsystem to provide a cooling effect, a desalination subsystem to produce freshwater, an expander to generate shaft work and electricity, and also a reverse osmosis desalination subsystem to further produce freshwater, wherein the absorption refrigeration subsystem, the desalination subsystem, the expander, and the reverse osmosis desalination subsystem are powered by a solar energy that is supplied by the solar power subsystem.

19 Claims, 16 Drawing Sheets

(51) Int. Cl.
*C02F 1/44* (2006.01)
*F25B 27/00* (2006.01)
*F01K 27/00* (2006.01)
*B01D 3/00* (2006.01)
*B01D 1/28* (2006.01)
*B01D 5/00* (2006.01)
*B01D 3/14* (2006.01)
*B01D 1/00* (2006.01)
*C02F 103/08* (2006.01)
*B01D 1/26* (2006.01)
*B01D 3/06* (2006.01)
*F25B 15/06* (2006.01)
*F25B 15/04* (2006.01)

(52) U.S. Cl.
CPC .............. *F25B 27/007* (2013.01); *B01D 1/26* (2013.01); *B01D 3/065* (2013.01); *C02F 2103/08* (2013.01); *C02F 2201/009* (2013.01); *F25B 15/04* (2013.01); *F25B 15/06* (2013.01)

(56) References Cited

U.S. PATENT DOCUMENTS

| | | | |
|---|---|---|---|
| 7,726,127 B2* | 6/2010 | Litwin | C01B 3/08 60/641.8 |
| 8,246,786 B2 | 8/2012 | Cap et al. | |
| 8,739,560 B2* | 6/2014 | Wang | F25B 15/02 62/101 |
| 9,393,502 B1* | 7/2016 | Zeitoun | B01D 3/065 |
| 2003/0041608 A1* | 3/2003 | Gonzalez-Cruz | F25B 27/007 62/235.1 |
| 2009/0090109 A1* | 4/2009 | Mills | F28D 20/0056 60/659 |
| 2010/0307153 A1* | 12/2010 | Hinderling | F22B 1/006 60/641.8 |
| 2011/0198208 A1* | 8/2011 | Olwig | C02F 1/048 203/10 |
| 2014/0290247 A1* | 10/2014 | Mishima | B01D 3/065 60/641.9 |
| 2015/0251924 A1* | 9/2015 | Li | F01K 23/064 203/10 |
| 2016/0002073 A1 | 1/2016 | Nowosielski-Slepowron | |
| 2016/0047361 A1* | 2/2016 | Al-Sulaiman | F01K 23/02 60/641.15 |
| 2016/0108763 A1 | 4/2016 | AlZahrani et al. | |

OTHER PUBLICATIONS

FR2869307_ENG (WIPO Patentscope machine translation of Baujat) (Year: 2005).*

Maurya, S., & Patel, D. (2014). Combined refrigeration cycle for thermal power plant using low grade waste steam. Int. J. Eng. Res. Appl, 4, 60-63. (Year: 2014).*

Butcher, Ken J.. (2005). CIBSE Guide B—Heating, Ventilating, Air Conditioning and Refrigeration—4.4.5 Absorption Refrigeration. CIBSE. (Year: 2005).*

Ayman Jamal Alazazmeh et al., "Review of Solar Cooling Technologies", Journal of Applied Mechanical Engineering, vol. 4, Issue 5, 2015, pp. 1-15.

* cited by examiner

INTEGRATED SYSTEM WITH AN ABSORPTION REFRIGERATION SUBSYSTEM AND A DESALINATION SUBSYSTEM

BACKGROUND OF THE INVENTION

Technical Field

The present invention relates to an integrated system that includes a solar power subsystem, an absorption refrigeration subsystem, and a desalination subsystem.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The demand for freshwater is always increasing, particularly in the areas of the world that are experiencing drought. Desalination systems have been used throughout the world for many years to supply freshwater for residential, industrial, and farming applications. It was always preferred to integrate the desalination systems with refrigeration systems, particularly in remote areas, in order to reduce the temperature of the freshwater for residential and/or industrial applications such as air conditioning, drinking, etc. In view of that, a combination of a solar-powered cooling system and a solar desalination system may offer a clean and a cost-effective route to reduce municipal water demands and particularly reduce greenhouse gas emissions.

Alazanneh and Mokheimer [Alazaimeh A J, Mokheimer E M (2015) Review of Solar Cooling Technologies, J. Appl. Mech. Eng. 4: 180, doi:10.4172/2168-9873.1000180] provided an intensive review of solar cooling technologies. They presented descriptions, applications and temperature ranges for each technology. Furthermore, they explained the working principles of multi-effect refrigeration cycles, combined power and cooling cycles, conventional combined Rankine cycles and vapor compression cycles. Kim and Ferreira [D. S. Kima, C. A. Infante Ferreira Solar refrigeration options—a state-of-the-art review, international journal of refrigeration, 31, 2008, 3-15] reviewed different solar based refrigeration technologies based on thermo-mechanical, absorption, adsorption, and desiccant solutions. Ghaddar et al. [Ghaddar, N., Shihab, M., Bdeir, F., Modeling and simulation of solar absorption system performance in Beirut, Renewable Energy, 1997, 10(4), 539-558] investigated a solar assisted absorption system. Hammed and Zurigat [Hammad, M., Zurigat, Y., Performance of a second generation solar cooling unit, Solar Energy, 1998, 62(2), 79-84] studied the performance of a solar assisted absorption system. Florides [Florides, G., Kalogirou, S., Tassou, S., Wrobel, L., Modeling and simulation of absorption solar cooling system for Cyprus, Solar Energy, 2002, 72(1), 43-51] designed a solar cooling system to provide the cooling demands of a house for one year. The system consists of a solar collector, storage tank, an auxiliary water heater and a LiBr/water absorption system. Lemmini et al. [Lemmini, F., Buret, Bahraoui, J., Pons, M., Meunier, F., Simulation des performances d'un refrigerator solaire an adsorption: comparison des performances pour deux types de charbonactif, Rev Int Froid, 1992, 15(3), 159] investigated the performance of adsorptive solar assisted cooling system and compared it with normal solid adsorption system. Pons and Guilleminot [Pons, M., Guilleminot, J., 1986, Design of experimental solar powered, solid-adsorption ice maker, Journal of Solar Energy Engineering, 108, 332-337] carried out a study on solar assisted solid adsorption icemaker. In addition, Wang et al. [Wang, R., Li, M., Xu, Y., Wu, J., 2000, An energy efficient hybrid system of solar powered water heater and adsorption ice maker, Solar Energy, 68, 189-195] investigated a solar assisted adsorption system with activated carbon. Pollerberg et al. [Pollerberg, A., Ali, H. and Dotsch, C. Solar driven steam jet ejector chiller, Applied Thermal Engineering, Vol. 29, No. 5-6, pp. 1245-1252, 2009] investigated a solar assisted steam ejector chiller over the entire year. The system included an experimental setup with a cooling capacity of 1 kW and two types of collectors; a parabolic trough (PTC) and vacuum tube collector (VTC). The effect of the operating temperatures and pressures on the efficiency of the solar collectors and the COP of the system were studied and presented. Wang et al. [Wang J., Wu J., Hu S. and Huang B., Performance of ejector cooling system with thermal pumping effect using R141b and R365mfc, Applied Thermal Engineering, Vol. 29, No. 10, pp. 1904-1912, 2009] studies an ejector cooling system that consisted of a multi-function generator that provided the required hot water for the ejector as a heat pump. In this study, R141b was used as the working refrigerant.

Further to the previous studies, Goswami and Lu [Lu S., Goswami D., Optimization of a novel combined power and refrigeration thermodynamic cycle, transaction of the ASME, 125:212-17, 2003] carried out a first law efficiency analysis of the combined power and refrigeration cycles, the system comprised a solar collector that could supply hot water at 90° C. Fan et al. [Fan, Y., Luo, L., and Souyri, B., 2007, "Review of Solar Sorption Refrigeration Technologies: Development and Applications," Renewable Sustainable Energy, Rev., 11, pp. 1758-1775] investigated a solar assisted ejector-absorption system and further explained the environmental advantages of using the proposed system. Agrawal and Karimi [Agrawal, B., Karimi, M., 2012, Thermodynamic performance assessment of a novel waste heat based triple effect refrigeration cycle, International journal of refrigeration, 35, 1647-1656] investigated a triple effect refrigeration cycle driven by a waste-energy heat source. The proposed cycle included a vapor compression cycle ($N_2O$ as a refrigerant), an absorption cycle (LiBr/Water system), and an ejector refrigeration cycle. Abdul Khaliq et al. [Abdul Khaliq A., Kumar R., Dincer I., and Khalid F., 2014, Energy and Exergy Analyses of a New Triple-Staged Refrigeration Cycle Using Solar Heat Source, Journal of Solar Energy Engineering, Vol. 136/011004] performed an energy and an exergy analysis of a triple effect solar driven refrigeration system, which included a vapor compression cycle ($N_2O$ as a refrigerant), an absorption cycle (LiBr/Water system), and an ejector refrigeration cycle. Rajesh Kumar et al. [Kumar R., Agrawal B., and Abdul Khaliq A., 2014, First and second law investigations of a new solar-assisted thermodynamic cycle for triple effect refrigeration, International Journal of energy research, 38:162-173] performed a thermodynamic analysis of a solar assisted multi-effect refrigeration cycle, which included a vapor compression cycle, an absorption cycle (LiBr/Water system), and an ejector refrigeration cycle.

In addition, Slesarenko developed a heat pump integrated with a desalination process working with steam [Slesarenko V V., Heat pumps as a source of heat energy for desalination of seawater. Desalination, 2001, 139:405-410]. A comparison between a chiller and a reverse osmosis desalination plant is proposed in the following studies [Byrne P, Ait Oumeziane Y, Serres L, Miriel J. Etude simulée d'un système de distillation membranaire pour le dessalement d'eau de mer couplé à une thermofrigopompe, 3ème Colloque International Francophone en Energétique et Mécanique, CIFEM 2014, 3-5 mai 2014, Moroni, Comores; Byrne P, Ait Oumeziane Y, Serres L, Miriel J., Study of a heat pump for simultaneous cooling and desalination, IMAT Conference, 26-27 Nov. 2014, Kuala Lumpur, Malaysia 2014]. Adsorption chillers was proposed to be employed to carry out simultaneous cooling and desalination in the work of Ghaffour et al. [Ghaffour N, Lattemann S, Missimer T, Ng K C, Sinha S, Amy G., Renewable energy-driven innovative energy-efficient desalination technologies, Int. J. Refrig. 2014, 39:23-37]. In the above studies, the cooling effect is generally a by-product of the proposed process. In addition to these references, IBM developed concentrated solar panels called "sunflowers" to supply off-grid energy, water, and cooling. The desalination system is a vacuum membrane distillation system, and the cooling energy is produced by an adsorption chiller. Fraunhofer ISE presented a simpler cooling and RO desalination system powered by a PV array, wherein a smart mini-grid is integrated for electricity supply [Schies A., Technological and economic assessment PV-diesel hybrid solutions versus other technologies, PEP Information Workshop: PV-Hybrid Systems in Indonesia, Berlin, 2013].

The solar cooling system or solar desalination systems have been disclosed in several patent references. For example, the patent reference WO 8,300,917 A1 discloses a hybrid solar cooling system, which includes a vapor compression cycle with an absorption refrigeration system. The system consists of a solar collector the supplies the required thermal energy to the generator, and the absorption chiller is equipped with a cooling coil connected to the vapor compression cycle. The patent reference U.S. Pat. No. 2,030,350 discloses a solar operated refrigeration system, which includes a solar heat source with an absorption cycle. The patent reference U.S. Pat. No. 4,531,384 discloses a refrigerator operated by solar energy, the energy collector contains zeolite with a very high adsorption and desorption capacity, and the system also includes an external tank, a condenser, an evaporator, and a three-way valve. The patent reference U.S. Pat. No. 8,286,431 B2 discloses a combined power cycle with a refrigeration cycle. The proposed cycle comprises a combustion turbine element, a steam turbine element, and a substantially closed cycle refrigeration cycle. The patent reference U.S. Pat. No. 5,727,379 discloses an electric power generation system that combines a gas turbine generator with a solar power plant and utilizes the gas turbine exhaust for producing superheat steam. The patent reference U.S. Pat. No. 4,323,052 discloses solar energy systems for desalination of water and generation of electricity by using photovoltaic cells.

In view of the forgoing, one objective of the present disclosure provides an integrated system that includes a solar power subsystem, an absorption refrigeration subsystem, and a desalination subsystem, wherein the absorption refrigeration subsystem and the desalination subsystem are powered by a solar energy that is supplied by the solar power subsystem. Another objective of the present disclosure provides the integrated system with an expander to generate shaft work and electricity, and also a reverse osmosis desalination subsystem.

BRIEF SUMMARY OF THE INVENTION

According to a first aspect, the present disclosure relates to an integrated system, including i) a solar power subsystem comprising a solar receiver, a heliostat field to reflect sunlight to the solar receiver, a steam generator, and a heat transfer fluid that circulates in the solar power subsystem, ii) a desalination subsystem comprising an ejector and a plurality of desalination evaporators, iii) an absorption refrigeration subsystem comprising a refrigeration evaporator, an absorber that contains an absorbent, a refrigeration generator, a refrigeration condenser, and a refrigerant that circulates in the absorption refrigeration subsystem, wherein the solar receiver is fluidly connected to the steam generator and the refrigeration generator, and the steam generator is fluidly connected to the ejector, and wherein the steam generator generates steam by withdrawing heat from the heat transfer fluid and supplies the steam to the ejector, and the refrigeration generator evaporates the refrigerant by withdrawing heat from the heat transfer fluid.

In one embodiment, the heat transfer fluid is at least one molten salt selected from the group consisting of sodium nitrate and potassium nitrate.

In one embodiment, the solar power subsystem further includes a hot storage tank for storing a hot heat transfer fluid and/or a cold storage tank for storing a cold heat transfer fluid.

In one embodiment, the solar power subsystem further includes a hot storage tank and a cold storage tank, wherein the hot storage tank is located downstream of and fluidly connected to the solar receiver, and the cold storage tank is located upstream of and fluidly connected to the solar receiver.

In one embodiment, each of the desalination evaporators includes a) a tube with a tube inlet and a tube outlet, wherein at least a portion of the tube is located in an interior of the desalination evaporator, and the tube inlet and the tube outlet are located outside of the interior of the desalination evaporator, b) a saline water inlet to deliver a saline water to the interior of the desalination evaporator, wherein the saline water is contacted with the tube thereby condensing steam inside the tube and concurrently forming steam in the interior of the desalination evaporator, c) a steam outlet to reject the steam from the interior of the desalination evaporator, d) a connecting steam line that fluidly connects the steam outlet to the tube inlet of a subsequent desalination evaporator or a desalination condenser, wherein the connecting steam line delivers the steam to the subsequent desalination evaporator or the desalination condenser, e) a brine outlet to reject brine from the interior of the desalination evaporator.

In one embodiment, the desalination subsystem further includes a freshwater line that is fluidly connected to the tube outlet of each of the desalination evaporators.

In one embodiment, the desalination subsystem includes a first desalination evaporator, a second desalination evaporator, a third desalination evaporator, and a fourth desalination evaporator that are fluidly connected in series, wherein the ejector is located upstream of and fluidly connected to the first desalination evaporator.

In one embodiment, the desalination subsystem further includes a desalination condenser located downstream of and fluidly connected to the fourth desalination evaporator.

In one embodiment, an interior of the second desalination evaporator is fluidly connected to the ejector.

In one embodiment, the desalination evaporators are arranged in a parallel feed configuration.

In one embodiment, the desalination evaporators are arranged in a parallel/cross flow configuration.

In one embodiment, the desalination evaporators are arranged in a forward feed configuration.

In one embodiment, the refrigeration condenser is located downstream of and fluidly connected to the refrigeration generator, the refrigeration evaporator is located downstream of and fluidly connected to the refrigeration condenser, the absorber is located downstream of and fluidly connected to the refrigeration evaporator, and the refrigeration generator is located downstream of and fluidly connected to the absorber, wherein the refrigeration condenser condenses the refrigerant, the refrigeration evaporator evaporates the refrigerant by withdrawing heat from an interior of the refrigeration evaporator, the absorbent in the absorber absorbs the refrigerant, and the refrigeration generator evaporates the refrigerant by withdrawing heat from the heat transfer fluid.

In one embodiment, the absorption refrigeration subsystem further includes a) a regenerator located upstream of and fluidly connected to the refrigeration generator and downstream of and fluidly connected to the absorber, wherein the regenerator increases a temperature of the refrigerant, b) a throttle valve located upstream of and fluidly connected to the refrigeration evaporator and downstream of and fluidly connected to the refrigeration condenser, wherein the throttle valve reduces a temperature and/or a pressure of the refrigerant.

In one embodiment, the refrigerant is water.

In one embodiment, the absorbent is an aqueous lithium bromide solution.

In one embodiment, the integrated system further includes a steam turbine located downstream of and fluidly connected to the steam generator, wherein the steam turbine expands a portion of the steam to generate a shaft work.

In one embodiment, the integrated system further includes a generator that is coupled to the steam turbine to convert the shaft work into electricity.

In one embodiment, the integrated system further includes a reverse osmosis desalination subsystem comprising a vessel with an internal cavity, a semi-permeable membrane that divides the internal cavity into a saline water zone and a permeate zone, and a pump that pressurizes a saline water inside the saline water zone, wherein the saline water is permeated through the semi-permeable membrane to form a desalinated water in the permeate zone.

In one embodiment, the pump is powered by the shaft work of the steam turbine.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
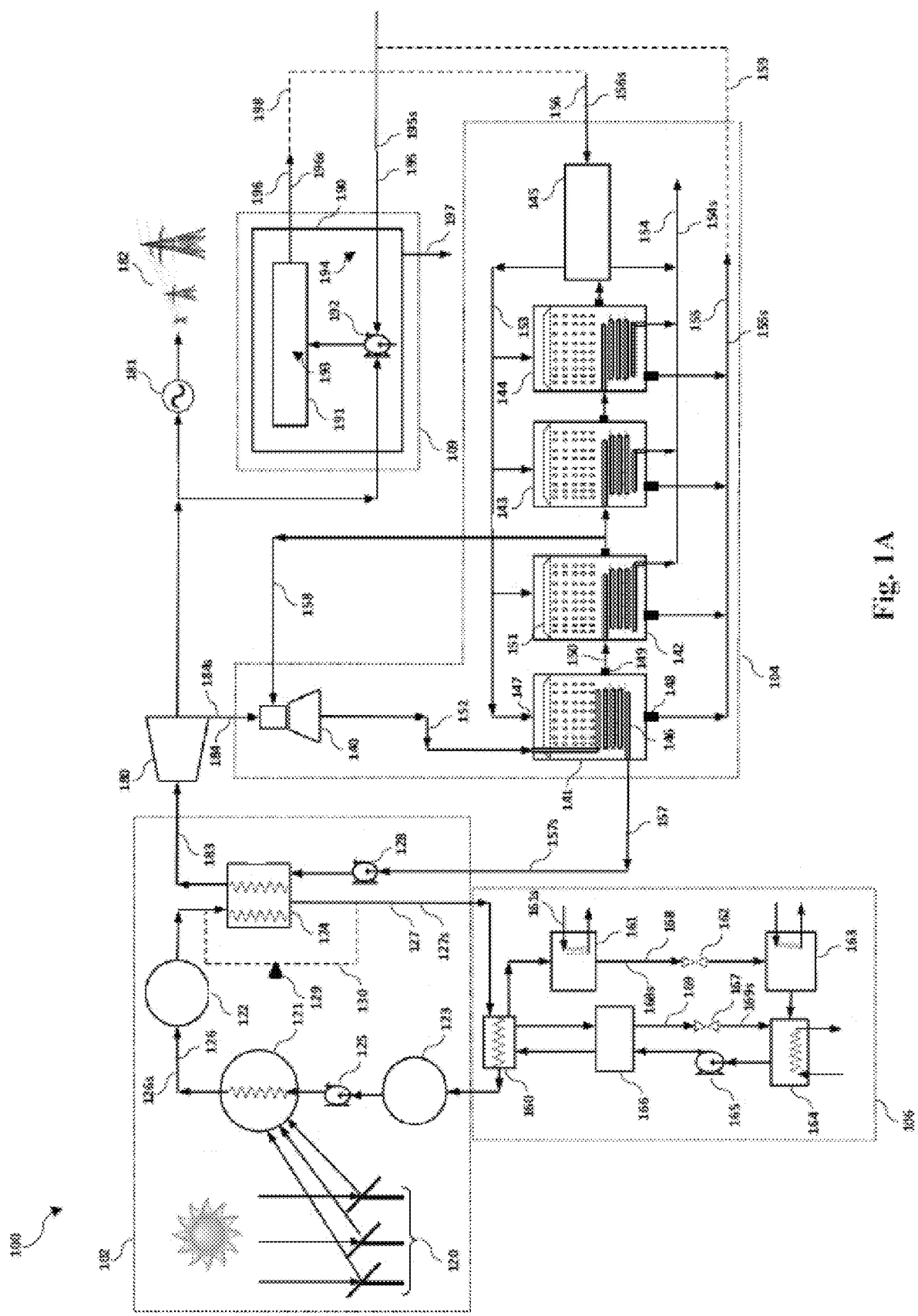
FIG. 1A is a schematic diagram of an integrated system, wherein desalination evaporators of a desalination subsystem are arranged in a parallel feed configuration.

Referring now to the drawings, wherein like reference numerals designate identical or corresponding parts throughout the several views.

According to a first aspect, the present disclosure relates to an integrated system 100. The term "integrated system" as used in this disclosure refers to a system that at least includes a solar power subsystem 102, a desalination subsystem 104, and an absorption refrigeration subsystem 106, wherein the desalination subsystem 104 and the absorption refrigeration subsystem 106 are powered by the solar power subsystem 102.

As used in this disclosure, the term "solar power subsystem" and the term "Steam Rankine Cycle" or (SRC) are identical and these terms may be used interchangeably. Also, the term "absorption refrigeration subsystem" or (ARS) and the term "Absorption Refrigeration Cycle" or (ARC) are identical and these terms may be used interchangeably.

Accordingly, the solar power subsystem 102 at least includes a solar receiver 121, a heliostat 120 to reflect sunlight to the solar receiver 121, a steam generator 124, and a heat transfer fluid that circulates in the solar power subsystem 102. The desalination subsystem 104 at least includes an ejector 140 and a plurality of desalination evaporators. Also, the absorption refrigeration subsystem 106 at least includes a refrigeration evaporator 163, an absorber 164 that contains an absorbent, a refrigeration generator 160, a refrigeration condenser 161, and a refrigerant that circulates in the absorption refrigeration subsystem 106. Accordingly, the steam generator 124 operates the desalination subsystem 104 and the refrigeration generator 160 operates the absorption refrigeration subsystem 106. In view of that, the solar receiver 121 is fluidly connected to the steam generator 124, wherein the steam generator 124 generates steam by withdrawing heat from the heat transfer fluid. On the other hand, the solar receiver 121 is fluidly connected to the refrigeration generator 160, wherein the refrigeration generator 160 evaporates the refrigerant by withdrawing heat from the heat transfer fluid. In addition, the steam generator 124 is fluidly connected to the ejector 140 to supply the steam to the ejector 140, in order to operate the ejector 140 and subsequently the desalination subsystem 104.

Hereinafter, various embodiments of the integrated system 100 and components are provided in detailed.

The term "steam generator" as used in this disclosure refers to a device that generates steam at various temperatures and pressures with a thermal energy that is supplied thereto, for example, via a thermal energy of the heat transfer fluid. Preferably, the steam generator 124 as used herein is a heat recovery steam generator 124—HRSG (may also be referred to as heat recovery vapor generator—HRVG).

The steam generator 124 may include a superheater that heats a saturated steam to a temperature above a saturation point. The superheater may preferably be present when the steam is supplied to an expander, e.g. a team turbine, wherein the temperature and the pressure of the steam substantially drops. Accordingly, the presence of the superheater may prevent formation of water droplets in the steam turbine. In addition, the steam generator 124 may preferably include one or more economizers, preheaters, evaporators, etc. The type and the structure of the steam generator 124 are not meant to be limiting and various other steam generators 124 may be utilized in the integrated system.

In some embodiments, the steam generator 124 generates a steam with a temperature of approximately 50 to 300° C., preferably 80 to 250° C., preferably 100 to 200° C., preferably 120 to 160° C. Also, a pressure of the steam may range from approximately 0.1 to 10 MPa, preferably 0.5 to 9 MPa, preferably 1 to 8 MPa, preferably 4 to 6 MPa. In some other embodiments, when the steam is delivered to the superheater, a super steam (super-saturated steam) may be produced, wherein a temperature of the super steam is 20% to 50%, preferably 25% to 45% higher than the temperature of the steam before entering the superheater, and a pressure of the super steam is 20% to 50%, preferably 25% to 45% higher than the pressure of the steam before entering the superheater. In one embodiment, an efficiency of the steam generator 124 varies in the range from about 70% to about 98%, preferably from about 85% to about 95%, preferably from about 90% to about 93%. In a preferred embodiment, the efficiency of the steam generator is 100%. The term "efficiency of the steam generator" as used herein refers to a ratio of the amount of energy of the steam to the amount of energy absorbed by water.

Figure 1B:
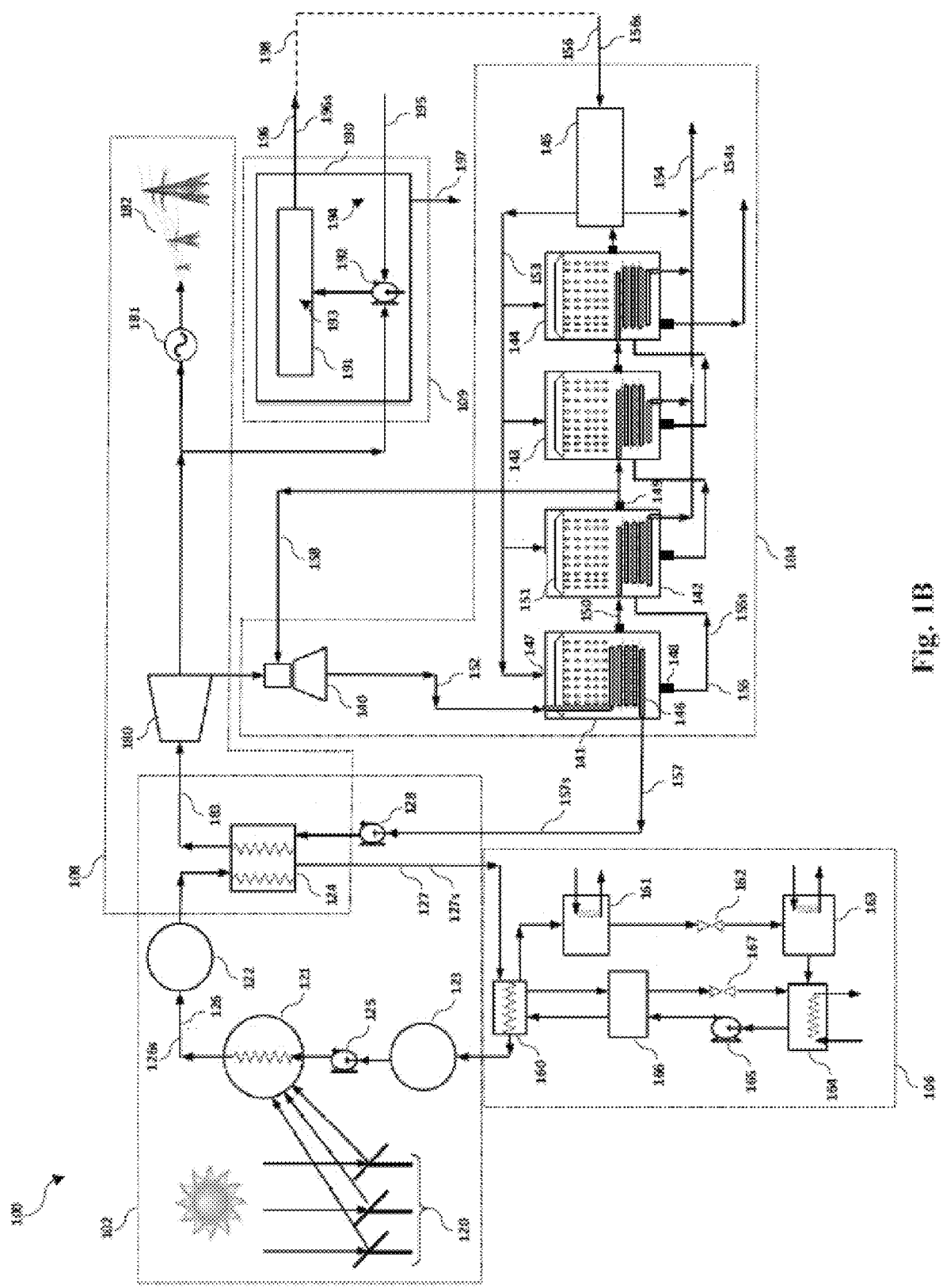
FIG. 1B is a schematic diagram of the integrated system, wherein desalination evaporators of the desalination subsystem are arranged in a parallel/cross flow configuration.
Figure 1C:
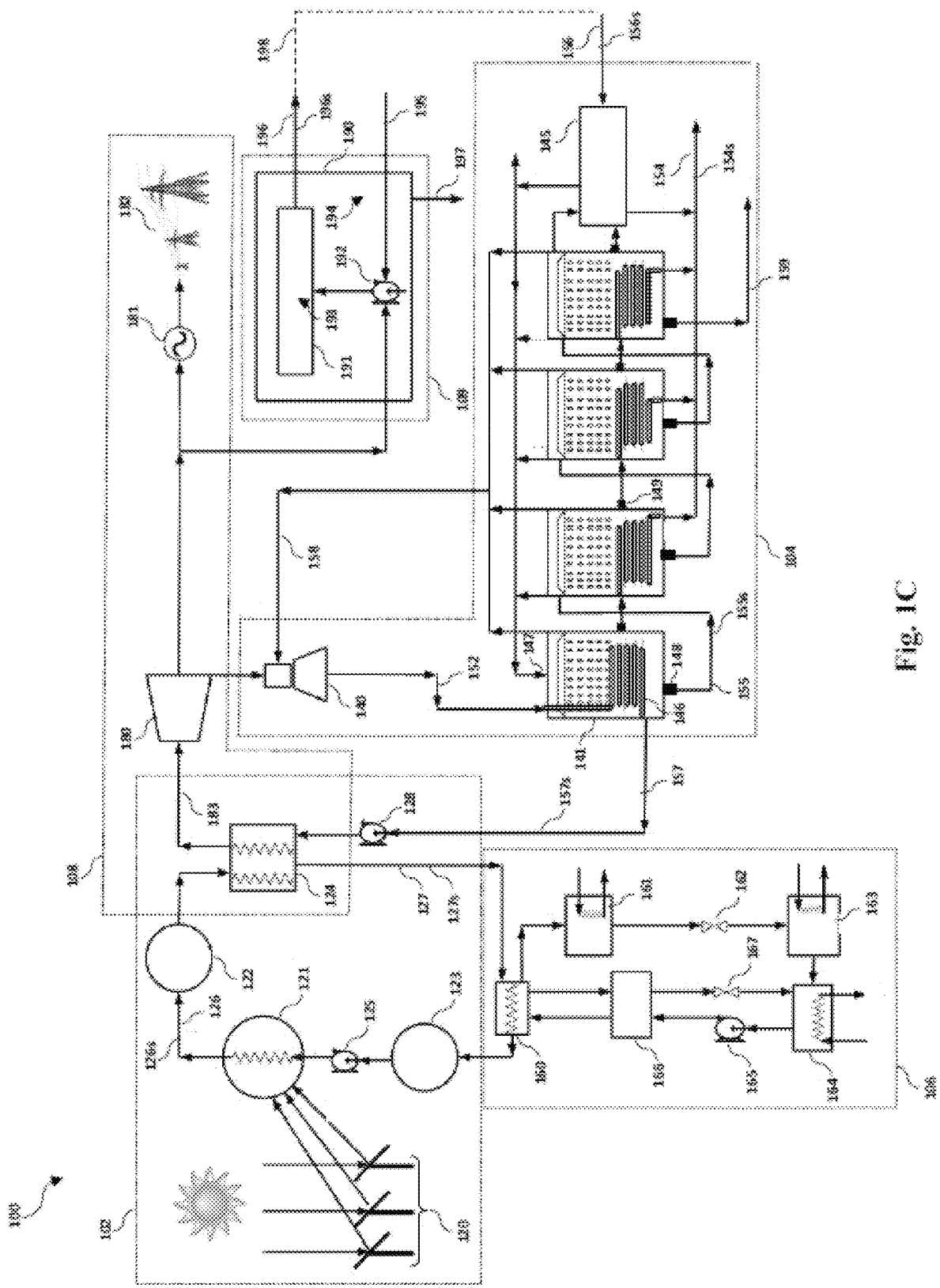
FIG. 1C is a schematic diagram of the integrated system, wherein desalination evaporators of the desalination subsystem are arranged in a forward feed configuration.

In a preferred embodiment, the steam (or the super steam) is first delivered to an expander 180 via line 183 before delivering to the ejector 140 (as shown in FIGS. 1A, 1B, and 1C). The term "expander" as used herein refers to a device, wherein a pressurized stream (e.g. steam) is expanded in an isentropic process (i.e. a constant entropy process), and wherein a thermal energy of that pressurized stream may be converted into a shaft work, which may subsequently be converted into an electrical power. In a preferred embodiment, the expander 180 is a steam turbine with blades that are extended outwardly around a shaft, wherein the steam drives/rotates the steam turbine around the shaft and therefore produce a shaft work. Preferably, the steam turbine may be coupled to a generator 181, and thus the shaft of the steam turbine drives the generator 181 thereby producing electricity. The electricity may further be supplied to a utility grid network 182 (as shown in FIGS. 1A, 1B, and 1C). In one embodiment, the electricity may operate electric devices of the solar power subsystem 102, the desalination subsystem 104, and the absorption refrigeration subsystem 106. The type and specification of the steam turbine and the generator 181 are not meant to be limiting and various steam turbines and generators may be utilized herewith. The shaft work may also be utilized to drive a pump, a compressor, a crankshaft of another engine, etc.

The steam 184$s$ that comes out of the steam turbine, i.e. the steam in line 184, may preferably have a temperature of approximately 80 to 200° C., preferably 90 to 150° C., preferably 110 to 130° C., and a pressure of approximately 100 kPa to 5 MPa, preferably 1.0 to 4.5 MPa, preferably 3.0 to 4.0 MPa. In one embodiment, an isentropic efficiency of the steam turbine may range from about 70% to about 95%, preferably from about 75% to about 90%, preferably about 85%. The term "isentropic efficiency of the steam turbine" as used herein refers to a ratio of an actual shaft work produced by the steam turbine to an isentropic shaft work that can be produced by the steam turbine.

After driving/rotating the steam turbine, the steam is delivered to the ejector 140. The term "ejector" (or "steam ejector 140") as used herein refers to a device that uses a high pressure gas (e.g. the steam) as to draw/entrain a gaseous stream, thereby creating vacuum in a processing unit that is connected thereto. The "ejector" comprises a convergent-divergent nozzle inside a housing with a convergent-divergent structure, and does not include a moving part. Accordingly, a diverging section of the ejector 140 accelerates the steam and simultaneously creates a partial vacuum in the desalination subsystem 104 by drawing/entraining a portion of steam that flows through line 158 to form a mixed steam that flows through line 152 (as shown in FIGS. 1A, 1B, and 1C).

The term "solar power subsystem" as used in this disclosure relates to a set of equipment that collects a solar energy during the daytime and generates steam using the solar energy. Accordingly, the solar power subsystem 102 at least includes a solar receiver 121, a heliostat 120 to reflect sunlight to the solar receiver 121, a steam generator 124, and a heat transfer fluid that circulates in the solar power subsystem 102 with a high temperature duty pump 125.

Various types of solar power subsystem 102, as known to those skilled in the art, may be utilized in the integrated system 100. For example, in some embodiments, a power tower concentrated solar power (CSP) system may be used. Alternatively, the solar power subsystem 102 may be a trough type solar collector, e.g. a parabolic trough or an enclosed trough, a Fresnel type e.g. a Fresnel reflector, a dish type, e.g. dish stirling, or a hybrid type, i.e. a combination of a trough type, a Fresnel type, and/or a dish type.

Referring to FIGS. 1A, 1B, and 1C, the heliostat 120 reflects sunlight to a predetermined target in the solar receiver 121. The solar receiver 121 may be located on the ground, or the solar receiver 121 may preferably be coupled to a tower structure having a predetermined height above the ground to receive solar radiation from the heliostat. The term "heliostat" as used herein refers to a device that includes a plurality of mirrors, usually a plane mirror (although curved mirrors may be used), which turns so as to keep reflecting solar radiation towards a predetermined target, compensating for the sun's apparent motions in the sky. In some embodiments, an overall reflective surface area of the heliostat 120 may in the range of 8,000 m$^2$ to 15,000 m$^2$, preferably 9,000 m$^2$ to 14,000 m$^2$, preferably 10,000 m$^2$ to 12,000 m$^2$. The heliostat is not meant to be limiting and various types of heliostats that are known to those skilled in the art may be utilized here.

Figure 2:
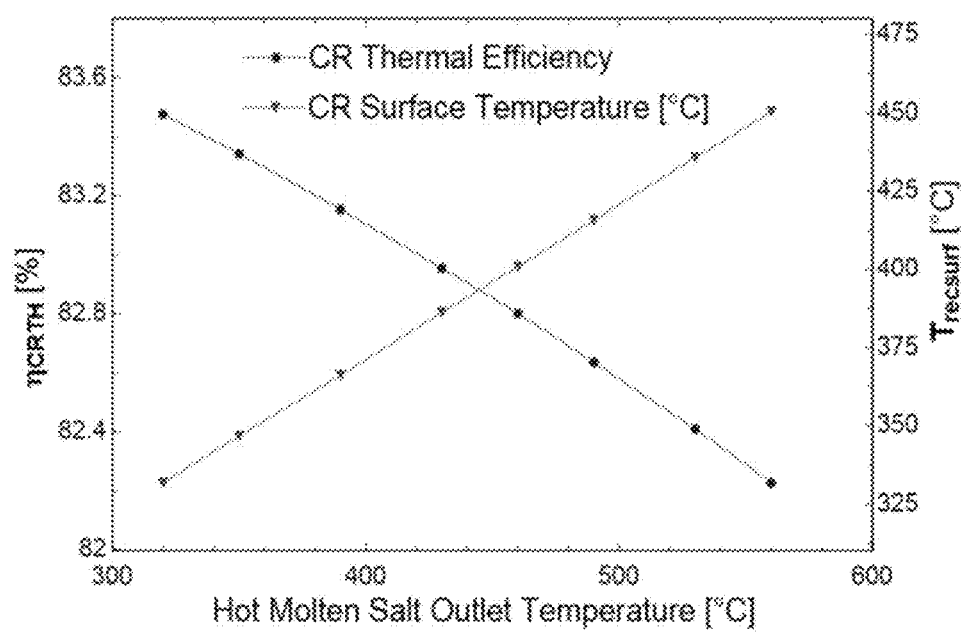
FIG. 2 represents a thermal efficiency and a surface temperature vs. a temperature of a heat transfer fluid in a solar receiver of the integrated system.

The term "solar receiver" as used herein refers to a transparent compartment that contains the heat transfer fluid. In some embodiments, an overall transparent surface area of the solar receiver 121 may in the range of 0.1 m$^2$ to 100 m$^2$, preferably 1.0 m$^2$ to 50 m$^2$, preferably 2.0 m$^2$ to 20 m$^2$. Preferably, the solar receiver may be located in a compartment that is made of a material with a very high thermal resistivity, as known to those skilled in the art, and a gap between the solar receiver and the compartment may be filled with a gas (e.g. air, nitrogen gas, or carbon dioxide) or vacuumed. Accordingly, a rate of heat transfer from the solar receiver to the environment is substantially reduced. In some embodiments, the solar receiver 121 receives a solar irradiance in the range of 200 to 1,000 W/m$^2$, preferably 300 to 900 W/m$^2$, preferably 400 to 800 W/m$^2$, and therefore a temperature of the heat transfer fluid, which flows inside the solar receiver 121, may rise to a value in the range of preferably 320 to 800° C., preferably 340 to 700° C. In one embodiment, the solar receiver 121 includes multiple tubes (or a coil-shape tube) that are made of highly temperature-resistant materials, as known to those skilled in the art. As shown in FIG. 2, a thermal efficiency of the solar receiver 121 varies in the range of 75% to 95%, preferably 80% to 90%, preferably 82% to 85%. The term "energy efficiency of the solar receiver" as used herein refers to a ratio of the amount of energy that is transported to the heat transfer fluid to the amount of energy that is received by the solar receiver. The solar receiver is not meant to be limiting and various types of solar receiver that are known to those skilled in the art may be utilized here.

In one embodiment, the heat transfer fluid is at least one molten salt selected from the group consisting of sodium nitrate and potassium nitrate. In some alternative embodiments, the heat transfer fluid is a molten salt, which is a nitrate of an alkali metal or an alkaline earth metal with a melting point of less than 600° C., preferably less than 400° C., preferably less than 300° C. For example, in one embodiment, the heat transfer fluid includes at least one molten salt selected from the group consisting of calcium nitrate, lithium nitrate, sodium nitrate, and potassium nitrate.

The molten salt may be circulated through the solar power subsystem 102 with the high temperature duty pump 125, thereby transporting energy therethrough. Steam is generated in the steam generator 124 as a result of a heat exchange between the molten salt and water that is delivered to the steam generator. The steam may further be supplied to the steam turbine to rotate the generator for power generation.

In some embodiments, the solar power subsystem 102 may include a hot storage tank 122 for storing a hot heat transfer fluid 126s and/or a cold storage tank 123 for storing a cold heat transfer fluid 127s. Preferably, the solar power subsystem 102 includes a hot storage tank 122 and a cold storage tank 123, wherein the hot storage tank 122 is located downstream of and fluidly connected to the solar receiver 121 via the line 126, and the cold storage tank 123 is located upstream of and fluidly connected to the solar receiver 121 and downstream of and fluidly connected to the steam generator 124 via the line 127 (as shown in FIGS. 1A, 1B, and 1C). According to these embodiments, a portion of the energy of the hot heat transfer fluid 126s, which may be stored during the daytime, may be utilized at night hours to generate steam with the steam generator 124 and also to evaporate the refrigerant with the refrigeration generator 160. Therefore, the integrated system 100 may still be operable during night hours. The term "hot heat transfer fluid" as used herein refers to the heat transfer fluid having a temperature in the range of 350 to 650° C., preferably 370 to 600° C. The hot heat transfer fluid 126s flows through the line 126 and accumulates in the hot storage tank 122. Also, the term "cold heat transfer fluid" as used herein refers to the cold transfer fluid having a temperature in the range of 250 to 350° C., preferably 270 to 300° C. The cold heat transfer fluid 127s flows through the line 127 and accumulates in the cold storage tank 123.

In some preferred embodiments, the hot and/or the cold storage tank may be located in a compartment that is made of a material with a very high thermal resistivity, as known to those skilled in the art, and a gap between the hot and/or the cold storage tank and the compartment may be filled with a gas (e.g. air, nitrogen gas, or carbon dioxide) or vacuumed. Accordingly, a rate of heat transfer from the hot and/or the cold storage tank to the environment is substantially reduced. In view of that, the hot and/or the cold storage tank may maintain the hot and/or the cold heat transfer fluid at the aforementioned temperatures for at least 20 hours, preferably at least 30 hours, preferably at least 40 hours.

In addition to the hot and the cold storage tanks 123, valves, pumps, flowmeters, and other processing equipment may be utilized in the solar power subsystem 102 to bypass the flow of the heat transfer fluid around the steam generator 124 and/or the refrigeration generator 160, and/or to control the flow rate of the heat transfer fluid within the solar power subsystem 102. For example, as shown in FIG. 1A, in a preferred embodiment, a bypass line 130 and a control valve 129 may be utilized, wherein the bypass line 130 and the control valve 129 are configured to vary the flow rate of the heat transfer fluid that is delivered to the steam generator 124 and to the refrigeration generator 160. Accordingly, a distribution of the power to the absorption refrigeration subsystem 106 and the desalination subsystem 104 can be altered depending on the demands and applications. For example, when more cooling power is needed, the control valve 129 opens the bypass line 130, and consequently the flow rate of the heat transfer fluid in the refrigeration generator 160 becomes larger that the flow rate of the heat transfer fluid in the steam generator 124. Therefore, the refrigeration generator 160 receives more power than the steam generator 124.

The term "desalination subsystem" as used in this disclosure relates to a set of equipment that produces freshwater from saline water, brackish water, seawater, or brine, wherein the desalination subsystem 104 is powered by the steam produced in the steam generator 124. The desalination subsystem 104 may be one of various types of desalination systems, e.g. multistage flash desalination, vacuum desalination, vapor-compression desalination, etc. As used in this disclosure. "brackish water" contains 0.05-3% by weight of dissolved salts, "saline water" and "seawater" contain 3-5% by weight of dissolved salts, and "brine" contains greater than 5% by weight of dissolved salts (as presented herein % by weight is relative to the total solution weight). In terms of the present disclosure, the term "saline water" is used as a general term for any water than contains more salinity than freshwater ("freshwater" contains less than 0.05% by weight of salinity), and may therefore refer to saline water, brackish water, seawater, or brine. Salts that may be present in the saline water that may be removed using the desalination subsystem 104 of the present disclosure may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. In a preferred embodiment, the saline water 156$s$ that is delivered to the desalination subsystem 104 via the line 156 is seawater that has a temperature in the range of 5 to 30° C., preferably 10 to 25° C., preferably about 12 to 20° C.

In a preferred embodiment, the desalination subsystem 104 is a multi-effect desalination (MED) type that includes a plurality of desalination evaporators that are arranged in series (as shown in FIGS. 1A, 1B, and 1C). Accordingly, each desalination evaporator includes a tube 146 with a tube inlet and a tube outlet, wherein at least a portion of the tube 146 is located in an interior of the desalination evaporator, and the tube inlet and the tube outlet are located outside of the interior of the desalination evaporator. Preferably, the tube 146 may have a coil-shape to provide an increased contacting surface area (as shown in FIGS. 1A, 1B, and 1C). A thermal energy to run the MED is supplied by the steam that flows inside a first desalination evaporator 141, i.e. the desalination evaporator that is located downstream of and fluidly connected to the ejector 140. In addition, each desalination evaporator of the MED further includes a saline water inlet 147 to deliver the saline water 156$s$, which flows inside the line 153, to the interior of the desalination evaporator, and preferably a water sprayer 151 that may be located at the saline water inlet 147 to spray/sprinkle the saline water to the interior of the desalination evaporator (as shown in FIGS. 1A, 1B, and 1C). The presence of the water sprayer 151 may be advantageous due to an increased contacting surface area of the saline water with the tube 146. When the saline water is contacted with the tube of the first desalination evaporator 141, a heat exchanging phenomenon takes place, wherein a portion of the steam that flows inside the tube is condensed and water condensate 157$s$ is pumped into the steam generator 124 via the line 157 using the pump 128. At the same time a portion of the saline water that is sprayed to the interior of the first desalination evaporator 141 evaporates and form steam. The water condensate 157$s$ may further be delivered to the steam generator 124 to produce steam again. Each desalination evaporator of the MED further includes a steam outlet 149 whereby the steam, which is produced from evaporating the saline water, is rejected from the interior of the desalination evaporator. Also, each desalination evaporator includes a connecting steam line 150 that fluidly connects the steam outlet 149 to the tube inlet of a subsequent desalination evaporator or a desalination condenser 145. The connecting steam line 150 delivers the steam, which is produced from evaporating the saline water, from each desalination evaporator to the subsequent desalination evaporator. In a last desalination evaporator that is located is a series arrangement (e.g. the desalination evaporator 144 as shown in FIG. 1A), the connecting steam line 150 fluidly connects the steam outlet 149 to an inlet of the desalination condenser 145 that is located downstream therefrom (as shown in FIGS. 1A, 1B, and 1C). Additionally, each desalination evaporator includes a brine outlet 148 to reject brine 155$s$, which is accumulated at a bottom of the desalination evaporator, from the interior of the desalination evaporator via the line 155 (as shown in FIGS. 1A, 1B, and 1C).

A composition of the steam that is produced in the steam generator 124 may preferably be substantially the same as the steam that is produced in the interior of the first desalination evaporator 141, however, a temperature and a pressure of the steam that is produced in the steam generator 124 may be higher than the steam that is produced in the interior of the desalination evaporators.

Preferably, the desalination subsystem 104 further includes a freshwater line 154 that is fluidly connected to the tube outlet of each of the desalination evaporators. Although in a preferred embodiment, the tube outlet of the first desalination evaporator 141 is fluidly connected to the steam generator 124, and therefore water condensate 157$s$ is not combined with the freshwater 154$s$ that is produced in desalination evaporators 142, 143, and 144.

The freshwater line 154 may deliver the freshwater 154$s$ to a downstream processing unit or a residential water treatment plant. The freshwater 154$s$ may be further processed to be utilized for drinking, or may be used in air conditioning or refrigerating systems in residential or industrial applications. The freshwater 154$s$ may further be utilized as distilled water for various chemical reactions or other applications known to those skilled in the art.

The freshwater 154$s$ that flows inside the freshwater line 154 may have a temperature in the range of 30 to 95° C., preferably 40 to 85° C., preferably 50 to 75° C. In view of that, in some embodiment, the saline water 156$s$ that flows in the line 156 may be pre-heated with the freshwater 154$s$ in a heat exchanger (not shown in FIGS. 1A, 1B, and 1C). For example, the saline water 156$s$ may have a temperature of approximately 20 to 25° C. preferably 21 to 24° C. before entering the heat exchanger, while it may have a temperature of approximately 35 to 60° C., preferably 40 to 55° C. after leaving the heat exchanger.

As mentioned previously the ejector 140 is fluidly connected to at least one connecting steam line 150 to generate vacuum inside the desalination evaporators. For example, in a preferred embodiment, the desalination subsystem 104 includes a first desalination evaporator 141, a second desalination evaporator 142, a third desalination evaporator 143, and a fourth desalination evaporator 144 that are fluidly connected in series, wherein the ejector 140 is located upstream of and fluidly connected to the first desalination evaporator 141. At the same time, the ejector 140 is fluidly connected to the connecting steam line 150 that connects the second desalination evaporator 142 to the third desalination evaporator 143, via the line 158 (as shown in FIGS. 1A, 1B, and 1C). Therefore, the ejector 140 draws the steam that is produced in the interior of the second desalination evaporator 142 via the line 158. The ejector 140 may be fluidly connected to the connecting steam line 150 that connects other desalination evaporators.

In some embodiments, the steam that flows inside the connecting steam line 150$s$ has lower temperatures and pressures than the steam that is produced in the steam generator 124. When the steam that is produced in the steam generator 124 is mixed with the steam, which flows inside the connecting steam line 150$s$, a mixed steam forms that may have a temperature of approximately 50 to 110° C., preferably 60 to 100° C., preferably 70 to 95° C., and a pressure of approximately 10 to 2,000 kPa, preferably 100 to 1,800 kPa. The mixed steam may be delivered to the first desalination evaporator 141 via the line 152 (as shown in FIGS. 1A, 1B, and 1C).

Figure 4:
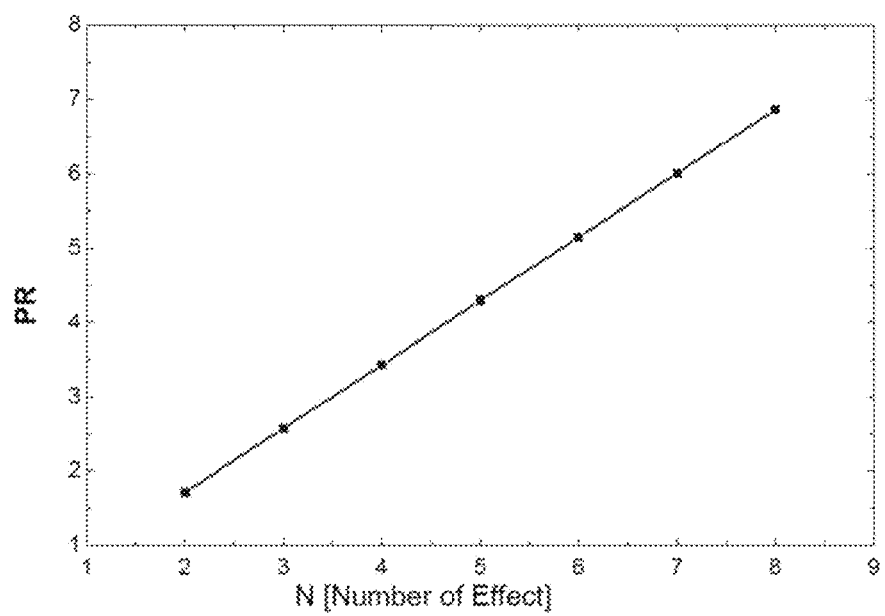
FIG. 4 represents an average performance ratio of the desalination subsystem vs. the number of desalination evaporators.

In some embodiments, more than four desalination evaporators may also be present in the desalination subsystem 104. For example, is some embodiments, five or six or seven or eight desalination evaporators may be present in the desalination subsystem 104. Accordingly, a performance ratio of the desalination system may vary in the range of 2 to 9, preferably 3 to 8, as shown in FIG. 4. The term "performance ratio" as used herein refers to a ratio of the amount of freshwater produced (in kg or kg per hour) to the amount of steam used (in kg or kg per hour).

Irrespective of the number of desalination evaporators that are used, operating temperatures and pressures may decrease from the first desalination evaporator 141 towards the end. In some embodiments, an internal volume of the desalination evaporators may decrease from the first desalination evaporator 141 towards the end.

Devices and equipment that are utilized in the desalination subsystem, e.g. the desalination evaporators, the desalination condenser, the pumps, the lines, the connecting steam line, the freshwater line, inlets and outlets, etc. are not meant to be limiting and various types of desalination evaporators, desalination condensers, pumps, lines, inlets and outlets may also be used.

In one embodiment, the desalination evaporators are arranged in a parallel feed configuration as shown in FIG. 1A. Accordingly, the brine outlets 148 of all the desalination evaporators are fluidly connected to a brine discharge line to discharge the brine that is accumulated in the interior of the desalination evaporators. In one embodiment, the desalination evaporators are arranged in a parallel/cross flow configuration as shown in FIG. 1B. Accordingly, the brine outlet 148 of each desalination evaporator is fluidly connected to the bottom of the subsequent desalination evaporator, wherein the brine 155$s$ that is accumulated at the bottom of the desalination evaporator is delivered to the bottom of the subsequent desalination evaporator. Since the subsequent desalination evaporator has a lower pressure than a preceding desalination evaporator, a portion of the brine 155$s$ may turn into steam, and thus an overall efficiency of the desalination subsystem 104 may be increased. In one embodiment, the desalination evaporators are arranged in a forward feed configuration as shown in FIG. 1C. Accordingly, the brine outlet 148 of each desalination evaporator is fluidly connected to a top of the subsequent desalination evaporator, wherein the brine 155$s$ that is accumulated at the bottom of the desalination evaporator is delivered to the top of the subsequent desalination evaporator. In view of that, the brine 155$s$ is contacted with the tube of the subsequent desalination evaporator and thus an overall efficiency of the desalination subsystem 104 may be increased. The term "bottom of the desalination evaporator" as used herein refers to an internal region of the desalination evaporator that is located less than 10%, preferably less than 5% of the total height of the desalination evaporator, when measured from the bottom of the vessel, with 0% being the bottom and 100% being the top of the desalination evaporator. Alternatively, the term "top of the desalination evaporator" as used herein refers to a region of the desalination evaporator that is located preferably less than 15%, preferably less than 10%, preferably less than 5% of the total height of the desalination evaporator, when measured from the top of the desalination evaporator, with 0% being the top and 100% being the bottom of the desalination evaporator.

The term "absorption refrigeration subsystem" (ARS) as used in this disclosure relates to a set of equipment that generates a cooling effect in the refrigeration evaporator 163 by utilizing a portion of heat of the heat transfer fluid. As described, the ARS 106 at least includes a refrigeration evaporator 163, an absorber 164 that contains an absorbent, a refrigeration generator 160, a refrigeration condenser 161, and a refrigerant that circulates in the absorption refrigeration subsystem 106. Accordingly, the refrigerant is evaporated in the refrigeration generator 160 by withdrawing heat from the heat transfer fluid (or the cold heat transfer fluid 127$s$). The refrigerant (in a vapor form) may further be delivered to the refrigeration condenser 161, which is located downstream of and fluidly connected to the refrigeration generator 160. The refrigeration condenser 161 condenses the refrigerant, e.g. via a cooling water that is supplied from a cooling tower. The refrigerant (in a liquid form) may further be delivered to the refrigeration evaporator 163, which is located downstream of and fluidly connected to the refrigeration condenser 161. The refrigerant withdraws heat from an interior of the refrigeration evaporator 163 and provides a cooling effect in the interior of the refrigeration evaporator 163. A temperature of the interior of the refrigeration evaporator 163 may vary depending on the applications of the ARS 106. For example, in some embodiments, the ARS 106 may be used for air conditioning applications, wherein the temperature of the interior of the refrigeration evaporator 163 may be set to a value in the range of 5 to 25° C., preferably 10 to 20° C., preferably about 12 to 15° C. In some other embodiments, the ARS 106 may be used as a refrigerator for residential or industrial applications, wherein the temperature of the interior of the refrigeration evaporator 163 may be set to a value in the range of 3 to 12° C., preferably about 5 to 10° C. In some embodiments, the temperature of the interior of the refrigeration evaporator 163 may reduce to subzero temperatures if refrigerants other than water are used. Since the refrigerant turns into a vapor in the refrigeration evaporator, it may be delivered to the absorber 164, which is located downstream of and fluidly connected to the refrigeration evaporator 163. The absorbent present in the absorber 164 absorbs the refrigerant. Once the refrigerant is absorbed onto the absorbent, the absorbent and the refrigerant may be delivered to the refrigeration generator 160, wherein the refrigerant is evaporated by withdrawing heat from the heat transfer fluid, thereby the refrigerant is separated from the absorbent. The refrigerant (in a vapor form) may further be delivered to the refrigeration condenser 161 for a subsequent cycle, and the absorbent may be recycled to the absorber 164 to be utilized in the subsequent cycle. The refrigerant may be circulated through the ARS with the pump 165.

In a preferred embodiment, the absorption refrigeration subsystem 106 further includes a regenerator 166 (or a heat exchanger) located upstream of and fluidly connected to the refrigeration generator 160 and downstream of and fluidly connected to the absorber 164, wherein the regenerator 166 increases a temperature of the refrigerant and the absorbent by withdrawing heat from the absorbent 169$s$ that is recycled to the absorber 164.

In one embodiment, the refrigerant is ammonia and the absorbent is water, however, in a preferred embodiment, the refrigerant is water and the absorbent is an aqueous lithium bromide solution. The refrigerant may include other compounds known to those skilled in the art such as, e.g. R152A and/or R32, although such refrigerants may preferably not be utilized due to the corrosive effects and environmental impacts (e.g. ozone layer depletion effects).

In a preferred embodiment, the absorption refrigeration subsystem 106 further includes a throttle valve 162 that is located on the line 168 and upstream of and fluidly connected to the refrigeration evaporator 163 and downstream of and fluidly connected to the refrigeration condenser 161, wherein the throttle valve 162 may reduce a temperature and/or a pressure of the refrigerant 168$s$, which is in a liquid form. The ARS 106 may further include a secondary throttle valve 167 that is located on the line 169 to recycle the absorbent 169$s$ to the absorber 164 (as shown in FIGS. 1A, 1B, and 1C). The second throttle valve 167 may reduce a temperature and/or a pressure of the absorbent, which is in a liquid form.

Devices, equipment, and materials that are utilized in the absorption refrigeration subsystem, e.g. the refrigeration evaporator, the absorber, the absorbent, the refrigeration generator, the refrigeration condenser, the refrigerant, the heat exchanger, the throttle valves, and the lines, etc. are not meant to be limiting and various types of refrigeration evaporators, absorbers, absorbents, refrigeration generators, refrigeration condensers, refrigerants, heat exchangers, throttle valves, etc. may also be used.

Figure 3A:
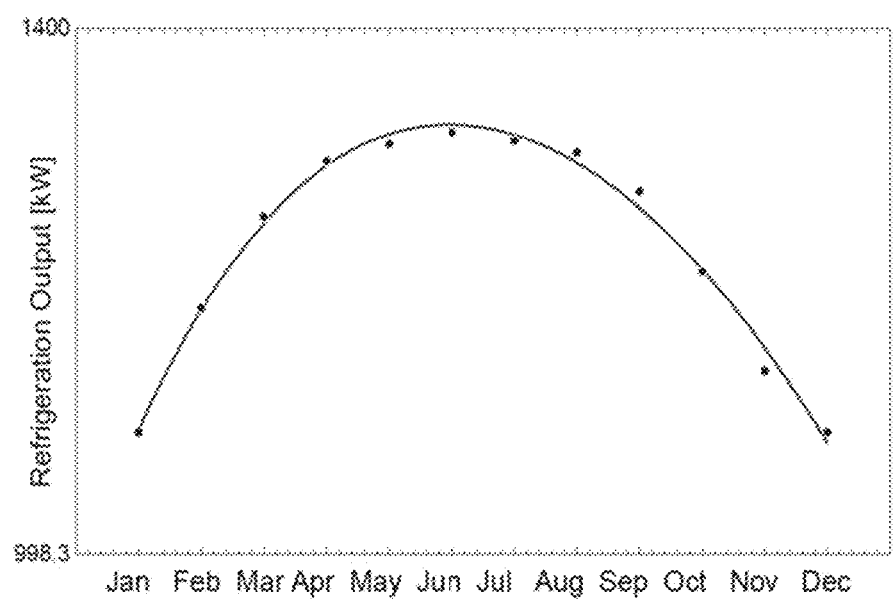
FIG. 3A represents an average cooling power output of an absorption refrigeration subsystem of the integrated system along a year.
Figure 3B:
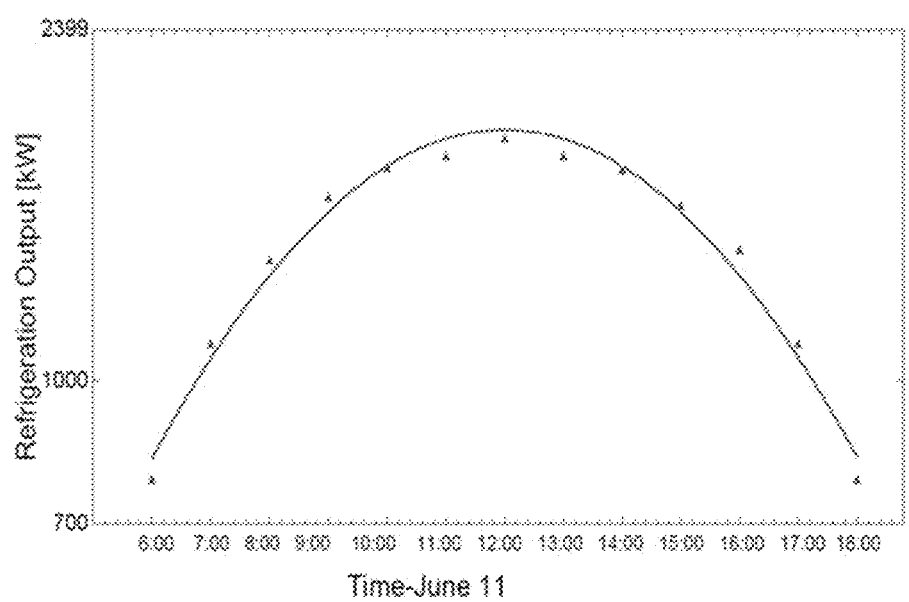
FIG. 3B represents an average cooling power output of the absorption refrigeration subsystem along a summer day.
Figure 3C:
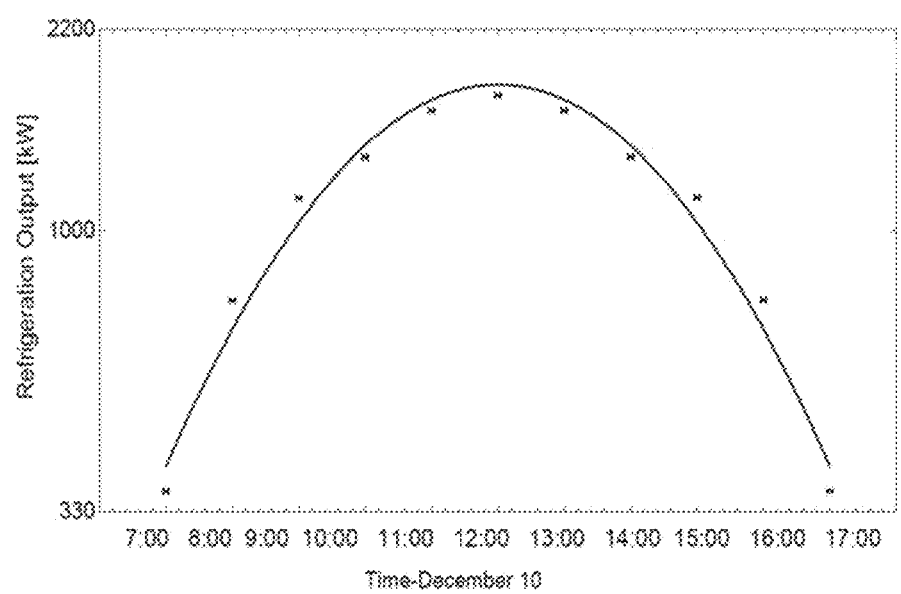
FIG. 3C represents an average cooling power output of the absorption refrigeration subsystem along a winter day.

In one embodiment, a refrigeration power of the ARS 106 ranges from about 300 kW to about 2,500 kW, preferably from about 500 kW to about 2,400 kW, as shown in FIGS. 3A, 3B, and 3C. The term "refrigeration power" as used herein refers to a heat extraction capacity of the ARS 106 in one hour.

The integrated system 100 may be utilized to produce freshwater with the desalination subsystem 104 and further reduce a temperature of the freshwater with the ARS 106, which is particularly advantageous for remote areas with high solar radiation and limited water resources. The presence of the ARS 106 in the integrated system 100 may increase an overall efficiency of the integrated system 100 due to the usage of low grade heat, e.g. the heat provided by the cold heat transfer fluid 127$s$.

In a preferred embodiment, the integrated system 100 further includes a reverse osmosis (RO) desalination subsystem 109. The term "reverse osmosis desalination subsystem" as used in this disclosure refers to a set of equipment that removes large particles, molecules and ions from saline water to form freshwater or drinking water. Accordingly, the RO desalination subsystem 109 at least includes a vessel 190 with an internal cavity, a semi-permeable membrane 191 that divides the internal cavity into a saline water zone 194 and a permeate zone 193, and the pump 192 that pressurizes a saline water 195$s$ that is delivered to the saline water zone 194 via the line 195 (as shown in FIGS. 1A, 1B, and 1C).

In reverse osmosis, a pressure is applied to the saline water 195$s$ (e.g. via the pump 192) to overcome osmotic pressure, a colligative property, which is driven by chemical potential. Accordingly, water molecules are permeated through the semi-permeable membrane 191 and freshwater (or desalinated water) is collected in the permeate zone 193. The RO subsystem may remove many types of molecules and ions from the saline water, including salts and bacteria, and thus may be utilized in both industrial processes and the production of potable water. In some embodiments, a selective membrane may be utilized, wherein the selective membrane has tailored (pre-defined) pore sizes. As a result, the selective membrane may not allow large molecules or ions through the pores (holes), but it may allow smaller molecules (e.g. water) or ions to pass freely.

The term "semi-permeable membrane" as used herein refers to a material which can separate components of the saline water 195$s$ that passes through the material into the permeate zone 193 and a retentate that is rejected or retained by the material in the saline water zone 194. Brine that is accumulated in the saline water zone 194 may be discharged via the line 197.

The semi-permeable membrane 191 may be made of polyamide, polystyrene, polyethersulfone, or polysulfone, e.g. in a form of a porous layer on top of a non-woven fabric support sheet. Alternatively, the semi-permeable membrane 191 may be made of plastic materials or polymers such as polyethylene, polypropylene, polyethylene terephthalate, etc. Other types of membranes, as well as other types of materials may be used in to construct the semi-permeable membrane of the present disclosure and are known to those of ordinary skill in the art.

In a preferred embodiment, the saline water 195$s$, which flows in the line 195, is seawater that has a temperature in the range of 10 to 25° C., preferably about 12 to 20° C.

The freshwater 196$s$ that is produced by the RO desalination subsystem 109 is collected from the line 196. The freshwater 196$s$ may be further processed to be utilized for drinking, or may be used in air conditioning or refrigerating systems in residential or industrial applications. The freshwater may further be utilized as distilled water for various chemical reactions or other applications known to those skilled in the art. In some embodiments, the freshwater 196$s$ that is obtained from the RO desalination subsystem 10) is mixed with the freshwater 154$s$ that is obtained from the desalination subsystem.

Figure 10:
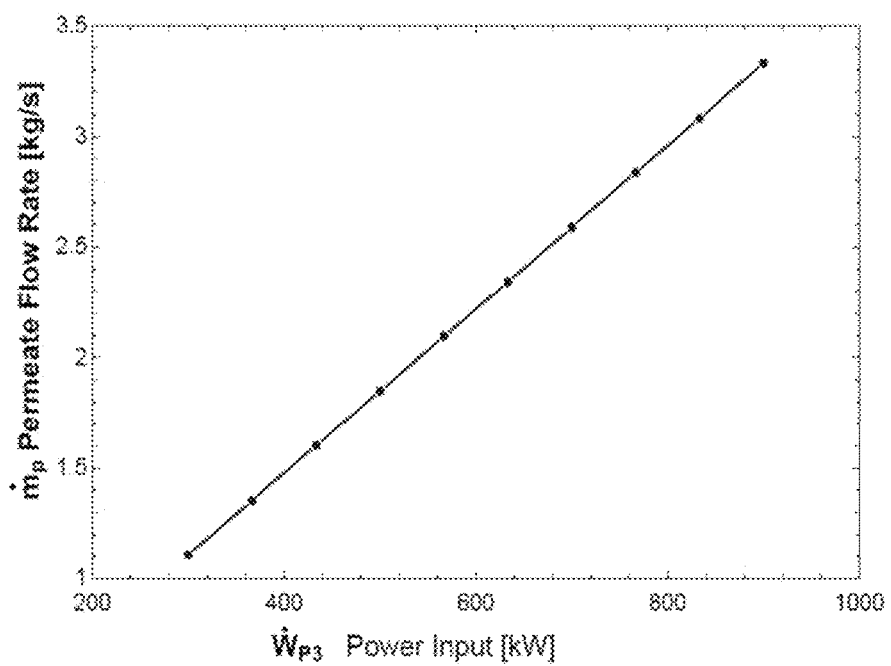
FIG. 10 represents an average mass flow rate of freshwater, which is obtained from a RO desalination subsystem, at various pump input powers.

In a preferred embodiment, the pump 192 is powered by the shaft work of the steam turbine. The type of pump that is used herein is not limited and various types of pumps may be utilized. Preferably, the amount of power consumed by the pump 192 may vary in the range of 200 to 1,000 kW, preferably 250 to 900 kW, as shown in FIG. 10. Accordingly, a flow rate of the freshwater 196$s$ that is obtained from the permeate zone 193 may vary in the range of 0.5 to 10 kg/s, preferably, 1.0 to 8.0 kg/s, preferably 1.2 to 5.0 kg/s, as shown in FIG. 10.

Depending on the salinity of the saline water, the pressure of the pump may be different. For example, in some embodiments, the saline water is seawater (i.e. having 3-5% by weight of dissolved salts) and the pump exerts a pressure in the range of 400 to 1,500 psi, preferably 500 to 1,300 psi, preferably 600 to 1,200 psi to the seawater to overcome the osmotic pressure of the dissolved salts. In some other embodiments, the saline water is brackish water (i.e. having 0.05-3% by weight of dissolved salts), and the pump exerts a pressure in the range of 20 to 500 psi, preferably 30 to 400 psi, preferably 40 to 300 psi to the brackish water to overcome the osmotic pressure of the dissolved salts. Preferably, the dissolved salts that may be removed via the RO desalination subsystem 109 may include, without limitation, sodium chloride, ammonium carbonate, ammonium bicarbonate, and ammonium carbamate, calcium carbonate, calcium bicarbonate, calcium phosphate, calcium fluoride, calcium silicate, and/or magnesium hydroxide.

In some embodiments, the integrated system 100 may optionally include the line 159 that fluidly connects the brine discharge line to the saline water zone 194 of the RO desalination subsystem 109, wherein the brine 155$s$ that is accumulated at the bottom of each desalination evaporator is delivered to the RO desalination subsystem via the line 159 to form freshwater or water with a lower salinity.

In some preferred embodiments, seawater is first delivered to the RO desalination subsystem 109, and the freshwater that is obtained from the permeate zone 193 is further delivered to the desalination subsystem via the line 198 to form highly desalinized water or distilled water. These embodiments are particularly advantageous in circumstances where supply water (e.g. seawater) to the desalination subsystem contains a variety of calcium-based salts, such as calcium carbonate and calcium bicarbonate, or other scale forming salts such as calcium sulfate, barium sulfate, strontium sulfate, calcium phosphate, calcium fluoride, calcium silicate, magnesium hydroxide, zinc carbonate, and the like. When supply water to the desalination subsystem contains these scale forming salts, scale or incrustation may build up on the tubes of the desalination evaporators that may cause technical problems and equipment shutdown. Accordingly, desalinating the supply water with the RO desalination subsystem 109 before delivering the supply water to the desalination subsystem may significantly reduce operating time of the desalination subsystem between overhauls.

In one embodiment, the integrated system 100 includes an RO control valve that is located on the line 195, and a MED control valve that is located on the line 156. Both the RO and the MED control valves are communicated with a processing unit, which controls the RO and the MED control valves based on the temperature of the saline water that flows inside the lines 156 and 195. For example, in one embodiment, seawater has a temperature in the range of 70 to 95° C., preferably 75 to 90° C. Accordingly, the processing unit closes the MED control valve and opens the RO control valve so the seawater is delivered to the RO desalination subsystem 109.

Devices and equipment that are utilized in the RO desalination subsystem, e.g. the vessel, the pump, the lines, etc. are not meant to be limiting and various types of vessels, pumps, etc. may be utilized.

In some embodiment, the integrated system 100 includes a plurality of control systems and switches for distributing the power output to the subsystems. For example, when freshwater is not needed, the desalination subsystem and/or the RO desalination subsystem 109 may go offline via the control systems and the switches, and all the power output goes into the steam turbine and the ARS 106. In addition, in the circumstances where the integrated system 100 produces a large amount of steam, the temperature and the pressure of the steam may be adjusted, so that the steam can be utilized in other processing where a low/medium/high pressure steam is demanded, e.g. in steam cracking units, etc.

In some embodiments, a power output that is generated by the solar power subsystem 102 may be in the range of 10 to 500 MW, preferably 20 to 400 MW, and preferably 30 to 300 MW. Preferably, the integrated system 100 may only be powered with the solar power subsystem 102, and no other auxiliary power sources may be included in the integrated system 100. Preferably, during night hours, i.e. in the absence of solar radiation, or during cloudy days, where sufficient solar radiation may not be received by the solar receiver 121, the integrated system 100 may still be powered from the energy of the heat transfer fluid that is stored in the hot and the cold storage tanks 123.

Figure 11:
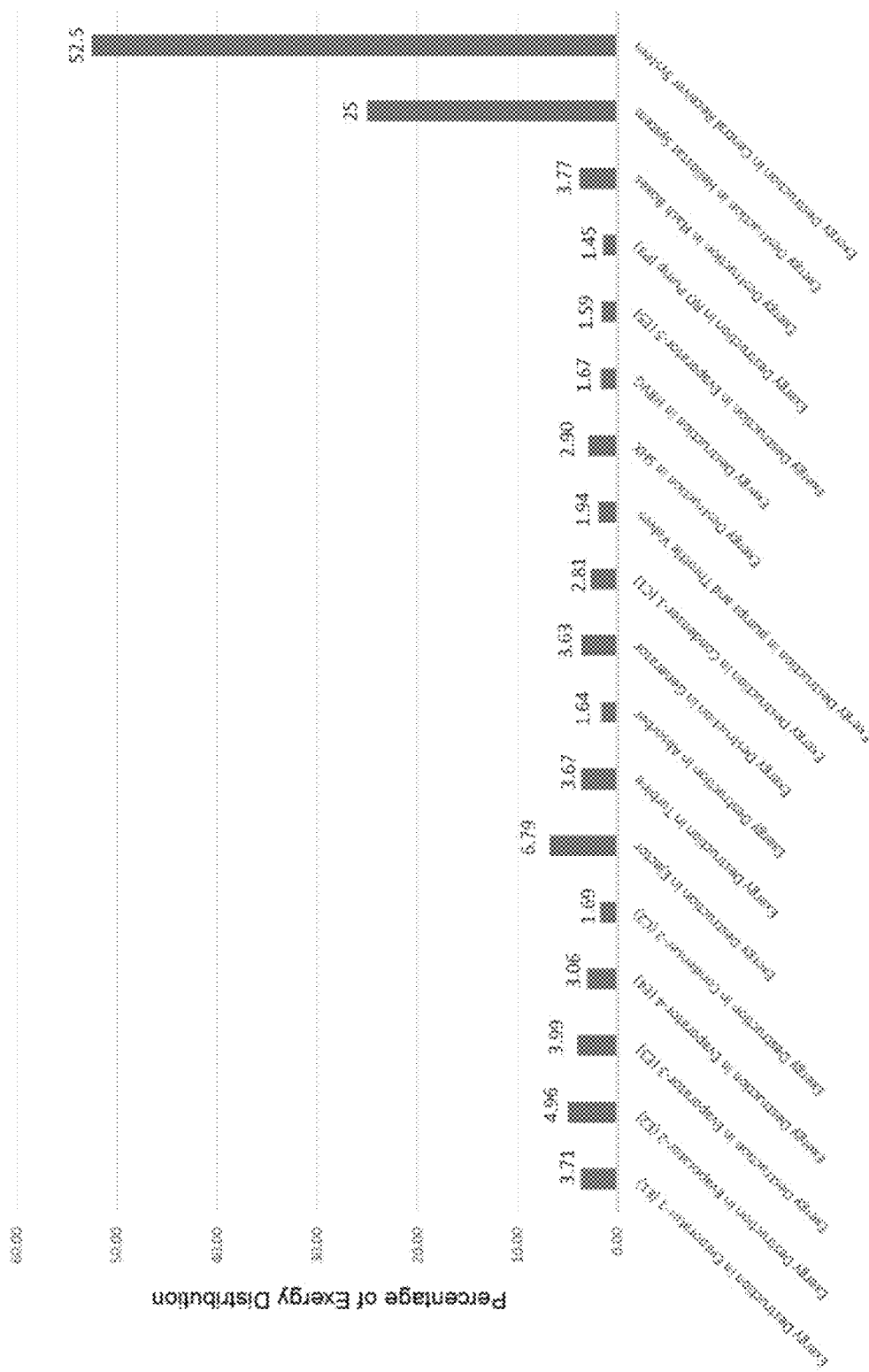
FIG. 11 represents a percentage distribution of exergy destruction at various components of the integrated system.

FIG. 11 represents a distribution of exergy destructions in various components of the integrated system 100. In one embodiment, an exergy destruction of the components in the integrated system 100 is no more than 10%, preferably no more than 8% by adopting control means. e.g. utilizing high thermal resistant compartments for the solar receiver, the hot and/or the cold storage tanks, to reduce the rate of heat transfer in the solar receiver 121, the hot storage tank 122, and/or the cold storage tank 123. As a result, the solar power subsystem 102 may supply more than sufficient power to operate the ARS 106 and the desalination subsystem; and the power may be more than sufficient to operate the steam turbine and the RO desalination subsystem 109. The term "exergy destruction" as used herein refers to a thermal energy (or power) that is available to be used, but irreversibly lost due to heat transfer with the environment, pressure drop, etc.

In the integrated system 100, the steam generator 124 and the refrigeration generator 160 are powered with the solar power subsystem 102 and without combustion of fossil fuels. Therefore, the cooling power provided by the ARS, the freshwater, the shaft work, and the electricity may be generated in an environmentally friendly manner and at a relatively low cost, and without emission of carbon dioxide into the atmosphere.

In some other embodiments, an overall production rate of freshwater by the integrated system 100 (i.e. the amount of freshwater produced by the desalination subsystem and the RO desalination subsystem 109) may be in the range of 5.0 t/h (ton per hour) to 300 t/h, preferably 10 t/h to 250 t/h, preferably 20 t/h to 200 t/h. The integrated system 100 may provide freshwater production rates outside of these ranges, by increasing the number of desalination evaporators, or increasing an effective surface area of the semi-permeable, or increasing the vacuum inside of each desalination evaporator by replacing the ejector 140 with a thermal vapor compressor, or changing the converging-diverging geometry of the ejector 140, etc.

The examples below are intended to further illustrate protocols for the integrated system, and are not intended to limit the scope of the claims.

Example 1

A thermodynamic analysis was conducted to assess the performance of the integrated system. Some of operating parameters varied over a typical range of operations to find out its effect on the overall cycle whereas values of other parameters kept constant at the level of the base case values.

The first law efficiency and energy distribution of solar heat source were calculated by energy balance approach or the first law analysis of the cycle. However, the exergy destruction or irreversibility in each component and the second law efficiency were calculated using the exergy balance approach or the second law analysis of the cycle. The exergy analysis found to be a useful analysis to point out the thermodynamic imperfection and work out to improve the performance of these components.

Assumption of the Solar Driven Absorption Cooling and Desalination Systems

All components of the proposed cycle considered in steady state. Accordingly, the pressure drop in the pipes in the proposed cycle was neglected. The heat losses to the surrounding in the Heat recovery generator, steam turbine, all condensers and all evaporators were neglected. The flow through the expansion valves were isenthalpic. The condenser leaving state considered as saturated liquid. The evaporator leaving state considered as saturated vapor. Solar heat source physical exergies were used only (chemical exergy for solar heat source was negligible). Chemical exergies, Kinetic and potential of the material were not taken into account in the analysis. The solution of LiBr was in equilibrium in the generator and absorber at standard temperature and pressure conditions. The solution was in a saturated state when leaving the absorber and the generator. Isobaric considered in evaporator, condenser and heat exchanger. One dimensional and steady state flow was considered in the ejector. The ejector walls were well insulated. The primary and secondary flow streams were considered in a saturated state when entering the ejector (states 5 and 11). All flow losses were taken into account by using isentropic efficiencies in the nozzle ($\eta n$), in the diffuser ($\eta d$), as well as in the mixing chamber ($\eta m$). Distillate was considered pure water (i.e. salinity of product water was 0 g/kg). Exchanger area in the effects was considered large enough to condense vapor to saturated liquid (i.e. quality=0), at the previous effect's pressure.

Seawater was considered an incompressible liquid and its properties were only a function of temperature and salinity. Energy losses to the environment were negligible. Non-equilibrium allowance (NEA) was negligible. Brine (liquid) and distillate (vapor) streams leave each effect at that effect's temperature. Distillate vapor was slightly superheated. The overall heat transfer coefficient was averaged over the length of an exchanger. The overall heat transfer coefficient in each effect and condenser is a function of temperature only. Approximations such as constant thermodynamic losses, constant properties, and constant distillate production in each effect breaks down with increasing the number of effect of these approximations, thermodynamic losses (specifically BPE) have the greatest effect on the evaluation of specific area. Constant specific heat, Cp, was considered for the seawater at different temperature and concentration. Constant thermodynamic losses were considered in all effects. Constant heat transfer area was considered in all effects. No vapor flashing takes place inside the effects. Feed seawater was considered at the saturation temperature of the first effect. Equal thermal loads were considered in all the effects. The formed vapors were considered salt free. The driving force for heat transfer in the effect was equal to the difference of the condensation and evaporation temperatures. Energy losses to the surroundings were considered negligible.

TABLE 1

Operating parameters of the computational study.
Main operating parameter considered in the proposed cycle

| Environment Temperature (° C.) | 20 |
|---|---|
| Environment Pressure (MPa) | 0.10135 |
| Turbine Inlet Pressure Range (MPa) | 0.9-1.7 |
| Hot Molten Salt Outlet Temperature (° C.) | 350-565 |
| Hot Molten Salt Inlet Temperature (° C.) | 290 |
| Generator temperature (° C.) | 130 |
| Solar Radiation Received (W/m$^2$) | 500-800 |
| Apparent Sun Temperature (K) | 4,500 |
| Heliostat Aperture Area (m$^2$) | 10,000 |
| Turbine Back Pressure Range (kPa) | 220-300 |
| Turbine Isentropic Efficiency (%.) | 85 |
| ARS Evaporator Temperature (° C.) | 6-10 |
| Condenser-2 Temperature (° C.) | 35 |
| Absorber Temperature (° C.) | 35 |
| Pump Isentropic Efficiency (%) | 70 |
| HRVG Efficiency (%) | 100 |
| Nozzle Efficiency (%) | 90 |
| Mixing Chamber Efficiency (%) | 85 |
| Diffuser Efficiency (%) | 85 |
| Optical Efficiency of Heliostat Field (%) | 75 |
| First Law Efficiency of Central Receiver (%) | 90 |
| Second Law Efficiency of Heliostat Field (%) | 75 |
| Second Law Efficiency of Central Receiver (%) | 30 |
| Effectiveness of SHX (%) | 50 |
| Central Receiver | |
| Aperture Area (m$^2$) | 16.96 |
| View Factor | 0.80 |
| Tube Diameter (m) | 0.019 |
| Tube Thickness (m) | 0.00165 |
| Emissivity | 0.80 |
| Reflectivity | 0.04 |
| Wind Speed (m/s) | 5 |
| Passes | 20 |
| MED System | |
| 1st Effect Temperature-T1 (° C.) | 64 |
| Feed Temperature-Tf (° C.) | 30 |
| Top Brine Temperature-TBT (° C.) | 64 |
| Temperature in Last Stage-Tn (° C.) | 36 |
| Feed Salinity- Xf (g/L) | 46 |
| Brine Salinity- Xb (g/L) | 69 |
| Total Distillate Mass Flow rate-D (kg/s) | 1 |

TABLE 1-continued

Operating parameters of the computational study.
Main operating parameter considered in the proposed cycle

| Number of Stages | 4 |
|---|---|
| Steam Temperature (° C.) | 70 |
| Seawater Temperature (° C.) | 25 |

Figure 12:
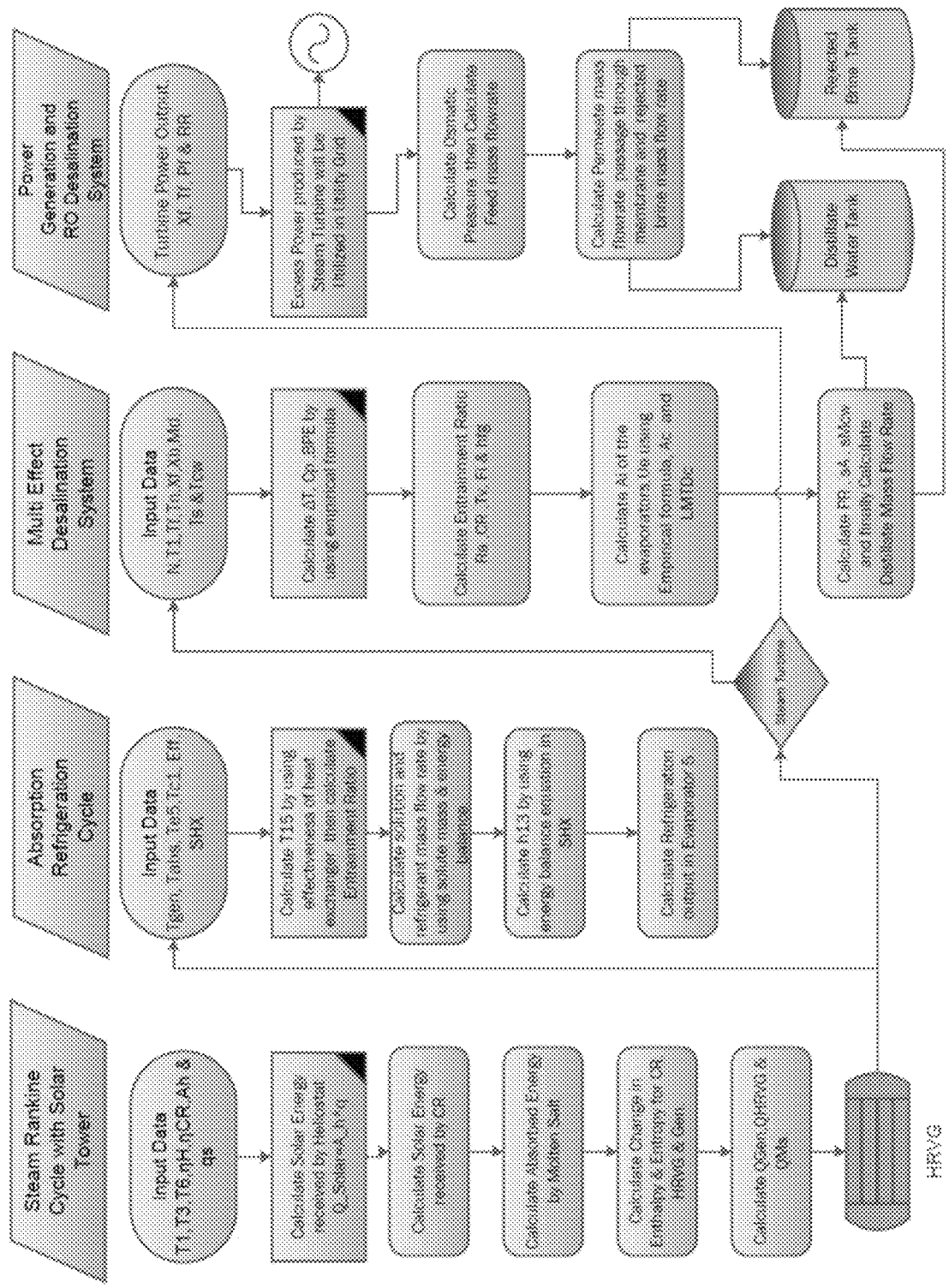
FIG. 12 is a block flow diagram that shows a computational algorithm for simulating the integrated system.

The flow chart of FIG. 12 shows the computational algorithm to model the integrated system that includes a desalination subsystem, a solar driven absorption cooling subsystem, and a power generation subsystem.

Example 2—CR Thermal Efficiency and Surface Temperature Variation with Hot Molten Salt Outlet Temperature FIG. 2 shows the solar receiver (or central receiver) energy efficiency and surface temperature variation with changing hot molten salt outlet temperature. It is observed that the energy efficiency decreased with increasing hot molten salt outlet temperature while the central receiver surface temperature is increased. The decrease in the energy efficiency might be due to the larger heat losses which could be associated with the higher surface temperature of the central receiver. Furthermore, there is a limitation on increasing the outlet temperature of molten salt due to material constraints of the pipes.

Example 3—Variation of the Refrigeration Output of the Proposed Cycle with Changing Average Daily and Hourly Solar Radiation In order to evaluate the performance of the solar field, the first step is to estimate the average daily solar radiation. The average values of daily and hourly solar radiation of Dhahran city, Saudi Arabia (at Altitude 90 m and latitude 26.5°) were estimated and listed in Tables 2 and 3. In this research we study the effect of hourly solar radiation on the performance of refrigeration cycles and on the performance ratio of multi effect desalination system. We selected an average day in a summer month (June 11) and the average day in winter (December 10) to study the effect of hourly solar radiation variation on the refrigeration cycle output.

TABLE 2

Weather Data and Average Daily solar radiation at Dhahran city.

| Month | Average day in the month | Day in the year | Number of Solar Hours | Daily Solar Radiation (W/m$^2$) | Ambient Temperature (° C.) | Relative Humidity (%) |
|---|---|---|---|---|---|---|
| January | 17 | 17 | 9 | 568.1 | 19.4 | 46 |
| February | 16 | 47 | 9 | 602.1 | 22.1 | 45 |
| March | 16 | 75 | 11 | 638.8 | 25.9 | 45 |
| April | 15 | 105 | 11 | 661.8 | 25.9 | 45 |
| May | 15 | 135 | 11 | 669.3 | 37 | 24 |
| June | 11 | 162 | 11 | 669.5 | 39.9 | 22 |
| July | 17 | 198 | 11 | 669.5 | 41.7 | 25 |
| August | 16 | 228 | 11 | 665.4 | 39.3 | 36 |
| September | 15 | 258 | 11 | 649.0 | 37.8 | 27 |
| October | 15 | 288 | 9 | 617.7 | 32.3 | 42 |
| November | 14 | 318 | 9 | 578.5 | 26.9 | 29 |
| December | 10 | 344 | 9 | 555.9 | 20.4 | 43 |

TABLE 3

Hourly solar radiation at Dhahran City on June 11 and December 10.

| Solar Time | June 11 Average Solar Radiation (W/m$^2$) | December 10 Average Solar Radiation (W/m$^2$) |
|---|---|---|
| 6:00 | 299.7 | 0 |
| 7:00 | 564.7 | 184.7 |
| 8:00 | 713.9 | 390.2 |
| 9:00 | 796.9 | 584.3 |
| 10:00 | 843.3 | 685.2 |
| 11:00 | 868.1 | 733.9 |
| 12:00 | 875.7 | 748.6 |
| 13:00 | 868.1 | 733.9 |
| 14:00 | 843.8 | 685.2 |
| 15:00 | 796.9 | 584.3 |
| 16:00 | 713.9 | 390.2 |
| 17:00 | 564.7 | 184.7 |
| 18:00 | 299.7 | 0 |

FIGS. 3A, 3B, and 3C show the effect of average daily solar radiation on the refrigeration outputs of absorption refrigeration system. It is seen that when the average daily solar radiation increases, it increases the refrigeration output of the absorption refrigeration system (ARS). The reason for the increase in the refrigeration output with increasing average daily solar radiation is due to the fact that when the average daily solar radiation increases, it will increase the hot molten salt mass flow rate in the generator of absorption refrigeration system and the thermal energy in the generator, which further increases the mass flow rate of the refrigeration evaporator and then increase the refrigeration output of ARS.

It can be seen from FIGS. 3A, 3B, and 3C that the refrigeration output of Absorption cycle reaches the maximum capacity with peak solar energy availability. The maximum average solar radiation was in June (768.2 W/m$^2$) and the refrigeration output reached the maximum capacity in this month (1,493 kW). The minimum average solar radiation was in December (615.1 W/m$^2$) and the refrigeration output was the minimum capacity in this month (1,195 kW). FIG. 3B shows the effect of average hourly solar radiation on June 11 (11 hours from 6:00 to 18:00) on the refrigeration outputs of absorption refrigeration system. It is seen that when the average hourly solar radiation increases, it increases the refrigeration output in ARS. FIG. 3C shows the effect of average hourly solar radiation on December 10 (9 hours from 7:00 to 17:00) on the refrigeration outputs of absorption refrigeration system. It is seen that when the average hourly solar radiation increases, it increases the refrigeration output in ARS.

Example 4—Multi-Effect Desalination with Parallel Flow Arrangement

A parametric study was conducted, and the present model was compared with four models from the literature. Performance ratio and specific area were evaluated for each of the models while varying the number of effects, steam temperature, or recovery ratio. In order to ensure that the values of the calculated heat transfer area from one model to the next are comparable, heat transfer coefficients in all models were evaluated using empirical formula, rather than assuming the constant values that were given in the assumption. All of the calculations in this section were evaluated, wherein the temperature differences, flow rates, and other desired operating conditions input to the model, and heat transfer areas and other sizing parameters were evaluated accordingly.

Example 5—Effect of Number of Effects

The number of effects is generally considered to be one of the strongest determinants of an MED system's performance. Each additional effect allows for an additional evaporation process in which the heat of vaporization was reused for an additional time. In the absence of thermodynamic losses, as the vapor condenses, it would release enough heat to exactly evaporate the same amount of new vapor. Therefore, in the ideal case, each additional effect would increase the performance ratio by one. As a result of losses as well as an increasing heat of vaporization with decreasing saturation temperature, it is observed that each additional effect increases the performance ratio by less than one. Further, the added benefit of each additional effect decreases. The present model shows this trend of PR increasing with number of effect (FIG. 4).

Figure 5:
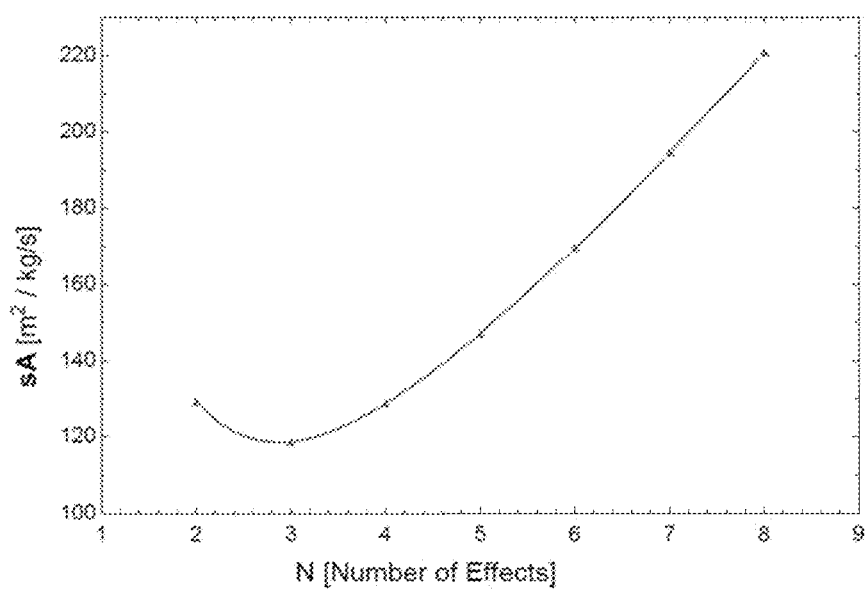
FIG. 5 represents an average specific heat transfer area of the desalination subsystem vs. the number of desalination evaporators.

Size of an MED plant is also strongly dependent on the number of effects. Adding additional effects resulted in a smaller driving temperature difference in each effect and lowered distillate production in each effect. Therefore, specific heat transfer area increased with number of effects (FIG. 5).

Example 6—Effect of Steam Temperature

Increasing top temperature tends to increase the performance of thermodynamic systems. The main benefit of increasing the top temperature of an MED system is that it creates a larger temperature range for the desalination process which allows for additional effects. However, when keeping the number of effects fixed and allowing the size of the effects to vary, increasing the top temperature does not have the expected effect on the performance ratio. Since the heat of vaporization decreases with increasing saturation temperature, all other things held constant, more steam is needed to evaporate a given quantity of water when the steam is at a higher temperature. As a result, PR decreases slightly with increasing steam temperature.

Figure 6:
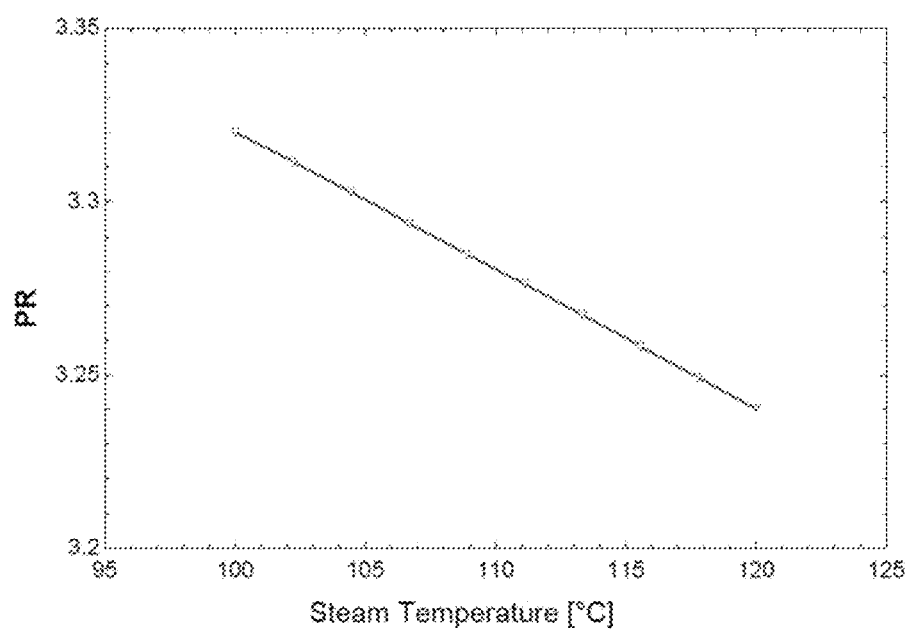
FIG. 6 represents an average performance ratio of the desalination subsystem vs. the temperature of steam that operates the desalination subsystem.
Figure 7:
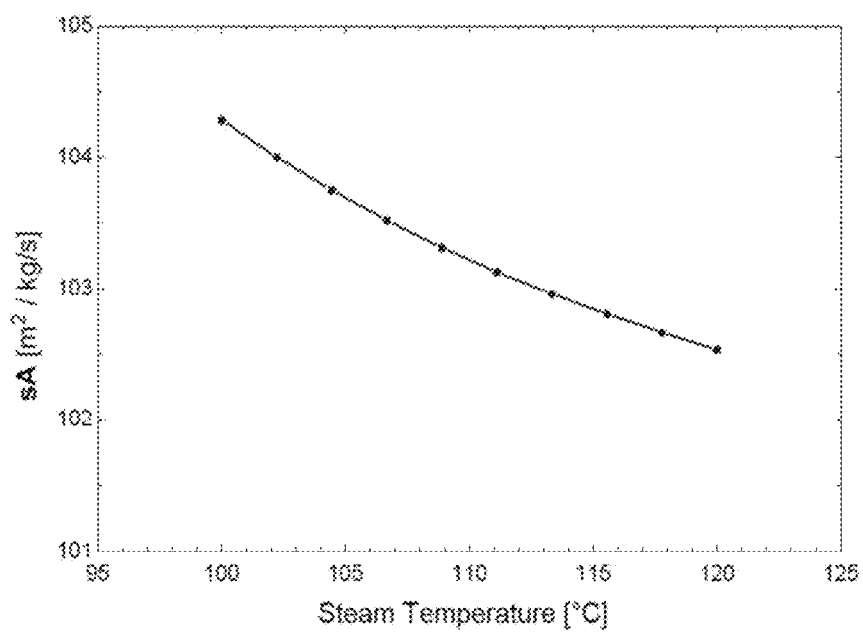
FIG. 7 represents an average specific heat transfer area of the desalination subsystem vs. the temperature of steam that operates the desalination subsystem.

FIG. 6 indicates the performance ratio decreases with increasing steam temperature because the heat of vaporization decreases with increasing temperature. The decrease in heat of vaporization results in additional steam needed to evaporate a given unit of water. With higher temperature steam provides less energy during condensation due to a lessened heat of vaporization, the increased temperature range of the MED system results in a larger temperature difference between each effect. The relevant temperature difference is that between the condensing distillate and the evaporating feed, heat transfer increases with increasing $\Delta T$. Since the number of effects and the total distillate flow rate is held constant for this analysis, the amount of heat transfer in each effect remains approximately constant. Therefore, when the driving temperature difference increased, the required heat transfer area decreased as shown in FIG. 7.

Example 7—Effect of Seawater Temperature

Figure 8:
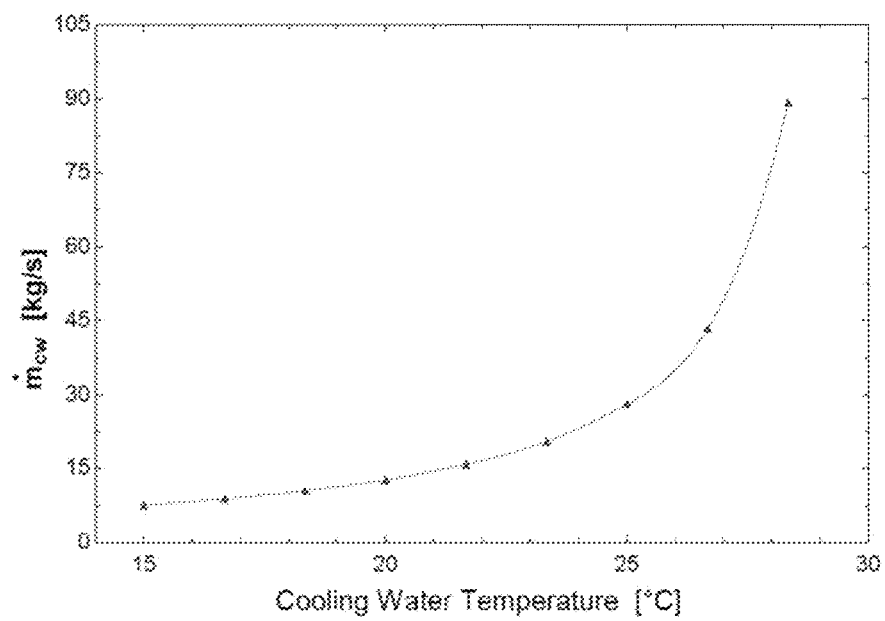
FIG. 8 represents variation of required mass flow rate of seawater, when used as a cooling water, at various seawater temperatures.
Figure 9:
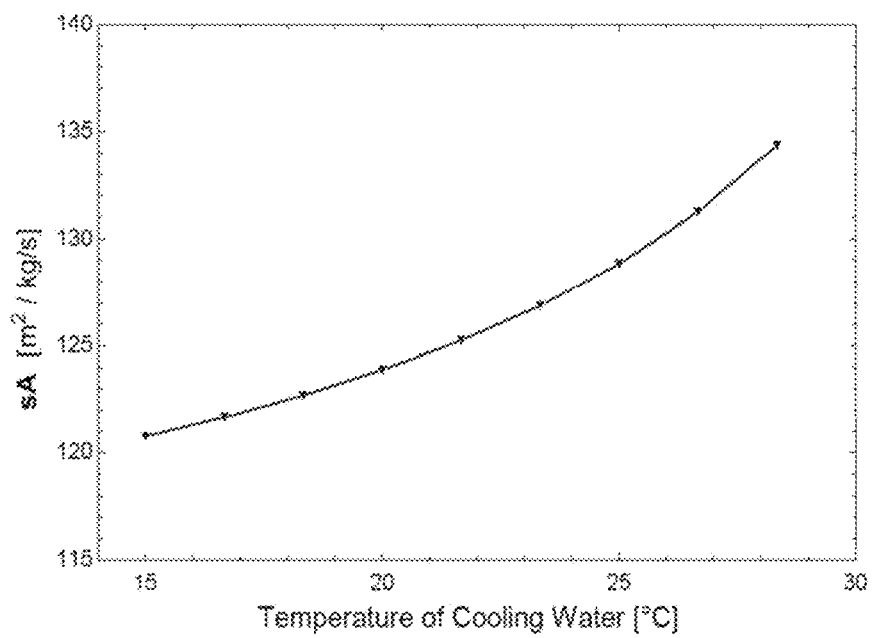
FIG. 9 represents variation of required specific heat transfer area of the desalination subsystem at various seawater temperatures.

The effect of seawater temperature on the specific area and specific seawater flow rate is shown in FIGS. 8 and 9. Increasing the cooling water temperature decreased the heat transfer potential in the condenser (less temperature difference) and accordingly a larger surface area is needed to absorb the required heat transfer rate. In addition, the less temperature difference demands higher cooling water flow rate as show in FIG. 8.

Changing the seawater temperature did not affect the PR of the system, since the steam temperature and vapor temperature were fixed and hence their latent heat of condensation was not affected. This is because the performance ratio depends on the ratio of latent heats of the steam and vapor formed in the evaporator. This ratio varies slightly upon the decrease or increase of the boiling temperature, because of simultaneous adjustment in the steam temperature.

FIG. 9 shows that increasing seawater temperature requires more specific heat transfer area to absorb the heat in the condenser therefore the control of seawater temperature of the influential parameter in this system as if the seawater temperature control within proper range then we can reduce the required heat transfer area then reduce the cost of condenser. The power produced in steam turbine was used to run the pumps in the reverse osmosis system. FIG. 10 shows that increasing of produced power increased the freshwater mass flow rate.

Example 8—Sun's Exergy Distribution and Exergy Destruction for Proposed Cycle

The exergy distribution of the proposed cycle was measured by applying an exergy balance to the system. The exergy analysis shows the following facts: i) the highest exergy destruction in novel cycle occurred in central receiver which is 52.5%, ii) the second largest exergy destruction in the novel cycle was found in the ejector, heat recovery generator, flash boxes, generator and Evaporators, which were in the range (3-7%) as shown in FIG. 11, iii) the second-law thermodynamic analysis shows that some component with maximum irreversibility, which are the central receiver, heliostat, heat recovery vapor generator, and ejector, therefore these component need special care in order to enhance the performance of these component and improve overall combined refrigeration cycle efficiency.

This serves as the first step for the improvement of the energy efficiency. The components with the highest exergy destruction were focused and lowering entropy generation techniques, e.g. reducing temperature difference for a heat exchanger and reducing pressure drops and friction in pipes were applied to reduce the entropy generation in those components.

The invention claimed is:

1. An integrated system, comprising:
a solar power subsystem comprising a solar receiver, a heliostat field to reflect sunlight to the solar receiver, a steam generator, and a heat transfer fluid that circulates in the solar power subsystem, the solar power subsystem configured to generate power;
a desalination subsystem comprising an ejector and a plurality of desalination evaporators, the desalination subsystem configured to receive power from the solar power subsystem and to output desalinized water;
an absorption refrigeration subsystem comprising a refrigeration evaporator, an absorber that contains an absorbent, a refrigeration generator, a refrigeration condenser, and a refrigerant that circulates in the absorption refrigeration subsystem, the absorption refrigeration subsystem being configured to receive power from the solar subsystem and to cool the desalinized water;
a control valve configured to control a bypass line, the bypass line controlling a flow of heat transfer fluid between the steam generator and the refrigeration generator and
a reverse osmosis desalination subsystem comprising a vessel with an internal cavity, a semi-permeable membrane that divides the internal cavity into a saline water zone and a permeate zone, and a pump that pressurizes a saline water inside the saline water zone,
a reverse osmosis control valve,
a multi-effect desalination valve, and
processing circuitry configured to control the reverse osmosis control valve and the multi-effect desalination valve based on a temperature of the saline water,
wherein the saline water is permeated through the semi-permeable membrane to form a desalinated water in the permeate zone,
wherein the solar receiver is fluidly connected to the steam generator and the refrigeration generator, and the steam generator is fluidly connected to the ejector, and
wherein the steam generator generates steam by withdrawing heat from the heat transfer fluid and supplies steam to the ejector, and the refrigeration generator evaporates the refrigerant by withdrawing heat from the heat transfer fluid.

2. The integrated system of claim 1, wherein the heat transfer fluid is at least one molten salt selected from the group consisting of sodium nitrate and potassium nitrate.

3. The integrated system of claim 1, wherein the solar power subsystem further comprises a hot storage tank for storing a hot heat transfer fluid and/or a cold storage tank for storing a cold heat transfer fluid.

4. The integrated system of claim 1,
wherein the solar power subsystem further comprises a hot storage tank and a cold storage tank, and
wherein the hot storage tank is located downstream of and fluidly connected to the solar receiver, and the cold storage tank is located upstream of and fluidly connected to the solar receiver.

5. The integrated system of claim 1, wherein each of the desalination evaporators comprises
a tube with a tube inlet and a tube outlet, wherein at least a portion of the tube is located in an interior of the desalination evaporator, and the tube inlet and the tube outlet are located outside of the interior of the desalination evaporator;
a saline water inlet to deliver a saline water to the interior of the desalination evaporator, wherein the saline water is contacted with the tube thereby condensing the steam from the ejector inside the tube and concurrently forming steam in the interior of the desalination evaporator;
a steam outlet to reject the formed steam from the interior of the desalination evaporator;
a connecting steam line that fluidly connects the steam outlet to the tube inlet of a subsequent desalination evaporator or a desalination condenser, wherein the connecting steam line delivers the steam to the subsequent desalination evaporator or the desalination condenser; and
a brine outlet to reject a brine from the interior of the desalination evaporator.

6. The integrated system of claim 5, wherein the desalination subsystem further comprises a freshwater line that is fluidly connected to the tube outlet of each of the desalination evaporators.

7. The integrated system of claim 1, wherein the desalination subsystem comprises a first desalination evaporator, a second desalination evaporator, a third desalination evaporator, and a fourth desalination evaporator that are fluidly connected in series, and wherein the ejector is located upstream of and fluidly connected to the first desalination evaporator.

8. The integrated system of claim 7, wherein the desalination subsystem further comprises a desalination condenser located downstream of and fluidly connected to the fourth desalination evaporator.

9. The integrated system of claim 7, wherein an interior of the second desalination evaporator is fluidly connected to the ejector.

10. The integrated system of claim 1, wherein the desalination evaporators are arranged in a parallel/cross flow configuration.

11. The integrated system of claim 1, wherein the desalination evaporators are arranged in a forward feed configuration.

12. The integrated system of claim 1, wherein the refrigeration condenser is located downstream of and fluidly connected to the refrigeration generator, the refrigeration evaporator is located downstream of and fluidly connected to the refrigeration condenser, the absorber is located downstream of and fluidly connected to the refrigeration evaporator, and the refrigeration generator is located downstream of and fluidly connected to the absorber, and wherein the refrigeration condenser condenses the refrigerant, the refrigeration evaporator evaporates the refrigerant by withdrawing heat from an interior of the refrigeration evaporator, the absorbent in the absorber absorbs the refrigerant, and the refrigeration generator evaporates the refrigerant by withdrawing heat from the heat transfer fluid.

13. The integrated system of claim 1, wherein the absorption refrigeration subsystem further comprises a regenerator located upstream of and fluidly connected to the refrigeration generator and downstream of and fluidly connected to the absorber, wherein the regenerator increases a temperature of the refrigerant, and a throttle valve located upstream of and fluidly connected to the refrigeration evaporator and downstream of and fluidly connected to the refrigeration condenser, wherein the throttle valve reduces a temperature and/or a pressure of the refrigerant.

14. The integrated system of claim 1, wherein the refrigerant is water.

15. The integrated system of claim 1, wherein the absorbent is an aqueous lithium bromide solution.

16. The integrated system of claim 1, further comprising:

a steam turbine located downstream of and fluidly connected to the steam generator, wherein the steam turbine expands a portion of the steam from the steam generator to generate a shaft work.

17. The integrated system of claim 16, further comprising:

a generator that is coupled to the steam turbine to convert the shaft work into electricity.

18. The integrated system of claim 16, wherein the pump is powered by the shaft work of a steam turbine.

19. An integrated system, comprising:

a solar power subsystem consisting of a solar receiver, a heliostat field to reflect sunlight directly to the solar receiver, a hot storage tank, a cold storage tank, a steam generator connected to the solar receiver via the hot storage tank, a pump connected between the solar receiver and the cold storage tank, and a heat transfer fluid that circulates in the solar power subsystem, the solar power subsystem configured to generate steam;

a desalination subsystem consisting of an ejector, a desalination condenser, and a plurality of desalination evaporators, the desalination subsystem configured to receive the steam from the solar power subsystem and to output desalinized water, each desalination evaporator including a saline water inlet, a water sprayer connected directly to the saline water inlet, a steam outlet, a brine outlet, a connecting steam line, and a tube, the desalination evaporators being arranged in a parallel feed configuration, the brine outlet of each desalination evaporator being connected directly to a brine discharge line, a connecting steam line of each desalination evaporator connecting each steam outlet to a subsequent desalination evaporator, the desalination condenser being connected to a last desalination evaporator via the connecting steam line of the last desalination evaporator;

a steam turbine coupled to a generator configured to receive the steam directly from the steam generator and to deliver the steam to the ejector of the desalination subsystem;

an absorption refrigeration subsystem consisting of a refrigeration evaporator, an absorber that contains an absorbent, a refrigeration generator, a refrigeration condenser, a first throttle valve, a second throttle valve, a pump, a regenerator, and a refrigerant that circulates in the absorption refrigeration subsystem, the first throttle valve being connected between the refrigeration condenser and the refrigeration evaporator, the second throttle valve and the pump being connected between the regenerator and the absorber, the refrigeration generator being coupled to the steam generator of the solar power subsystem, the absorption refrigeration subsystem being configured to cool the desalinized water;

a control valve configured to control a bypass line, the bypass line controlling a flow of heat transfer fluid between the steam generator and the refrigeration generator;

a reverse osmosis desalination subsystem consisting of a vessel with an internal cavity, a semi-permeable membrane that divides the internal cavity into a saline water zone and a permeate zone, and a pump that pressurizes a saline water inside the saline water zone, the pump being coupled to the steam turbine;

a reverse osmosis control valve;

a multi-effect desalination valve; and processing circuitry configured to control the reverse osmosis control valve and the multi-effect desalination valve based on a temperature of the saline water, wherein the saline water is permeated through the semi-permeable membrane to form a desalinated water in the permeate zone, the solar receiver is fluidly connected to the steam generator and the refrigeration generator, and the steam generator is fluidly connected to the ejector, and the steam generator generates steam by withdrawing heat from the heat transfer fluid and supplies the steam to the ejector, and the refrigeration generator evaporates the refrigerant by withdrawing heat from the heat transfer fluid.

* * * * *